United States Patent
Buenrostro et al.

(10) Patent No.: US 10,075,019 B2
(45) Date of Patent: Sep. 11, 2018

(54) VOLTAGE SOURCE ISOLATION IN WIRELESS POWER TRANSFER SYSTEMS

(71) Applicant: WiTricity Corporation, Watertown, MA (US)

(72) Inventors: Christopher Buenrostro, Lexington, MA (US); Paul Gerardus Hlebowitsh, Somerville, MA (US)

(73) Assignee: WiTricity Corporation, Watertown, MA (US)

( * ) Notice: Subject to any disclaimer, the term of this patent is extended or adjusted under 35 U.S.C. 154(b) by 68 days.

(21) Appl. No.: 15/356,798

(22) Filed: Nov. 21, 2016

(65) Prior Publication Data

US 2017/0149280 A1    May 25, 2017

Related U.S. Application Data

(60) Provisional application No. 62/258,144, filed on Nov. 20, 2015.

(51) Int. Cl.
*H02J 50/40* (2016.01)
*H02J 50/10* (2016.01)
(Continued)

(52) U.S. Cl.
CPC .............. *H02J 50/10* (2016.02); *H02J 7/025* (2013.01); *H02J 50/40* (2016.02); *H02J 50/60* (2016.02); *H02J 50/90* (2016.02)

(58) Field of Classification Search
CPC .................................. H02J 50/10; H02J 50/90
See application file for complete search history.

(56) References Cited

U.S. PATENT DOCUMENTS 645,576 A    3/1900   Tesla
649,621 A    5/1900   Tesla
(Continued)

FOREIGN PATENT DOCUMENTS

CA        142352        8/1912
CN      102239633      11/2011
(Continued)

OTHER PUBLICATIONS

"Intel CTO Says Gap between Humans, Machines Will Close by 2050", *Intel News Release*, (See intel.com/.../20080821comp. htm?iid=S . . . ) (Printed Nov. 6, 2009).
(Continued)

*Primary Examiner* — Thienvu Tran
*Assistant Examiner* — Pinping Sun
(74) *Attorney, Agent, or Firm* — Fish & Richardson P.C.

(57) ABSTRACT

The disclosure features wireless power transmitters that include a power source, a first coil connected to the power source, a second coil connected in series to the first coil, and a third coil positioned in proximity to the second coil, where during operation of the wireless power transmitters, the power source applies a driving voltage to the first and second coils, the first coil generates a first magnetic field that transfers power to a receiver resonator, the second coil generates a second magnetic field that induces a voltage across the third coil, and the induced voltage across the third coil is applied to a component of the wireless power transmitters.

9 Claims, 9 Drawing Sheets

(51) Int. Cl.
  *H02J 7/02*  (2016.01)
  *H02J 50/60*  (2016.01)
  *H02J 50/90*  (2016.01)

(56) References Cited

U.S. PATENT DOCUMENTS

| | | | |
|---|---|---|---|
| 787,412 A | 4/1905 | Tesla |
| 1,119,732 A | 12/1914 | Tesla |
| 2,133,494 A | 10/1938 | Waters |
| 3,517,350 A | 6/1970 | Beaver |
| 3,535,543 A | 10/1970 | Dailey |
| 3,780,425 A | 12/1973 | Penn et al. |
| 3,871,176 A | 3/1975 | Schukei |
| 4,088,999 A | 5/1978 | Fletcher et al. |
| 4,095,998 A | 6/1978 | Hanson |
| 4,180,795 A | 12/1979 | Matsuda et al. |
| 4,280,129 A | 7/1981 | Wells |
| 4,450,431 A | 5/1984 | Hochstein |
| 4,588,978 A | 5/1986 | Allen |
| 5,027,709 A | 7/1991 | Slagle |
| 5,033,295 A | 7/1991 | Schmid et al. |
| 5,034,658 A | 7/1991 | Hiering et al. |
| 5,053,774 A | 10/1991 | Schuermann et al. |
| 5,070,293 A | 12/1991 | Ishii et al. |
| 5,118,997 A | 6/1992 | El-Hamamsy |
| 5,216,402 A | 6/1993 | Carosa |
| 5,229,652 A | 7/1993 | Hough |
| 5,287,112 A | 2/1994 | Schuermann |
| 5,341,083 A | 8/1994 | Klontz et al. |
| 5,367,242 A | 11/1994 | Hulman |
| 5,374,930 A | 12/1994 | Schuermann |
| 5,408,209 A | 4/1995 | Tanzer et al. |
| 5,437,057 A | 7/1995 | Richley et al. |
| 5,455,467 A | 10/1995 | Young et al. |
| 5,493,691 A | 2/1996 | Barrett |
| 5,522,856 A | 6/1996 | Reineman |
| 5,528,113 A | 6/1996 | Boys et al. |
| 5,541,604 A | 7/1996 | Meier |
| 5,550,452 A | 8/1996 | Shirai et al. |
| 5,565,763 A | 10/1996 | Arrendale et al. |
| 5,630,835 A | 5/1997 | Brownlee |
| 5,697,956 A | 12/1997 | Bornzin |
| 5,703,461 A | 12/1997 | Minoshima et al. |
| 5,703,573 A | 12/1997 | Fujimoto et al. |
| 5,710,413 A | 1/1998 | King et al. |
| 5,742,471 A | 4/1998 | Barbee, Jr. et al. |
| 5,821,728 A | 10/1998 | Sshwind |
| 5,821,731 A | 10/1998 | Kuki et al. |
| 5,864,323 A | 1/1999 | Berthon |
| 5,898,579 A | 4/1999 | Boys et al. |
| 5,903,134 A | 5/1999 | Takeuchi |
| 5,923,544 A | 7/1999 | Urano |
| 5,940,509 A | 8/1999 | Jovanovich et al. |
| 5,957,956 A | 9/1999 | Kroll et al. |
| 5,959,245 A | 9/1999 | Moe et al. |
| 5,986,895 A | 11/1999 | Stewart et al. |
| 5,993,996 A | 11/1999 | Firsich |
| 5,999,308 A | 12/1999 | Nelson et al. |
| 6,012,659 A | 1/2000 | Nakazawa et al. |
| 6,047,214 A | 4/2000 | Mueller et al. |
| 6,066,163 A | 5/2000 | John |
| 6,067,473 A | 5/2000 | Greeninger et al. |
| 6,108,579 A | 8/2000 | Snell et al. |
| 6,127,799 A | 10/2000 | Krishnan |
| 6,176,433 B1 | 1/2001 | Uesaka et al. |
| 6,184,651 B1 | 2/2001 | Fernandez et al. |
| 6,207,887 B1 | 3/2001 | Bass et al. |
| 6,232,841 B1 | 5/2001 | Bartlett et al. |
| 6,238,387 B1 | 5/2001 | Miller, III |
| 6,252,762 B1 | 6/2001 | Amatucci |
| 6,436,299 B1 | 8/2002 | Baarman et al. |
| 6,450,946 B1 | 9/2002 | Forsell |
| 6,452,465 B1 | 9/2002 | Brown et al. |
| 6,459,218 B2 | 10/2002 | Boys et al. |
| 6,473,028 B1 | 10/2002 | Luc |
| 6,483,202 B1 | 11/2002 | Boys |
| 6,515,878 B1 | 2/2003 | Meins et al. |
| 6,535,133 B2 | 3/2003 | Gohara |
| 6,561,975 B1 | 5/2003 | Pool et al. |
| 6,563,425 B2 | 5/2003 | Nicholson et al. |
| 6,597,076 B2 | 7/2003 | Scheible et al. |
| 6,609,023 B1 | 8/2003 | Fischell et al. |
| 6,631,072 B1 | 10/2003 | Paul et al. |
| 6,650,227 B1 | 11/2003 | Bradin |
| 6,664,770 B1 | 12/2003 | Bartels |
| 6,673,250 B2 | 1/2004 | Kuennen et al. |
| 6,683,256 B2 | 1/2004 | Kao |
| 6,696,647 B2 | 2/2004 | Ono et al. |
| 6,703,921 B1 | 3/2004 | Wuidart et al. |
| 6,731,071 B2 | 5/2004 | Baarman |
| 6,749,119 B2 | 6/2004 | Scheible et al. |
| 6,772,011 B2 | 8/2004 | Dolgin |
| 6,798,716 B1 | 9/2004 | Charych |
| 6,803,744 B1 | 10/2004 | Sabo |
| 6,806,649 B2 | 10/2004 | Mollema et al. |
| 6,812,645 B2 | 11/2004 | Baarman |
| 6,825,620 B2 | 11/2004 | Kuennen et al. |
| 6,831,417 B2 | 12/2004 | Baarman |
| 6,839,035 B1 | 1/2005 | Addonisio et al. |
| 6,844,702 B2 | 1/2005 | Giannopoulos et al. |
| 6,856,291 B2 | 2/2005 | Mickle et al. |
| 6,858,970 B2 | 2/2005 | Malkin et al. |
| 6,906,495 B2 | 6/2005 | Cheng et al. |
| 6,917,163 B2 | 7/2005 | Baarman |
| 6,917,431 B2 | 7/2005 | Soljacic et al. |
| 6,937,130 B2 | 8/2005 | Scheible et al. |
| 6,960,968 B2 | 11/2005 | Odendaal et al. |
| 6,961,619 B2 | 11/2005 | Casey |
| 6,967,462 B1 | 11/2005 | Landis |
| 6,975,198 B2 | 12/2005 | Baarman |
| 6,988,026 B2 | 1/2006 | Breed et al. |
| 7,027,311 B2 | 4/2006 | Vanderelli et al. |
| 7,035,076 B1 | 4/2006 | Stevenson |
| 7,042,196 B2 | 5/2006 | Ka-Lai et al. |
| 7,069,064 B2 | 6/2006 | Govorgian et al. |
| 7,084,605 B2 | 8/2006 | Mickle et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,127,293 B2 | 10/2006 | MacDonald |
| 7,132,918 B2 | 11/2006 | Baarman et al. |
| 7,147,604 B1 | 12/2006 | Allen et al. |
| 7,180,248 B2 | 2/2007 | Kuennen et al. |
| 7,191,007 B2 | 3/2007 | Desai et al. |
| 7,193,418 B2 | 3/2007 | Freytag |
| D541,322 S | 4/2007 | Garrett et al. |
| 7,212,414 B2 | 5/2007 | Baarman |
| 7,233,137 B2 | 6/2007 | Nakamura et al. |
| D545,855 S | 7/2007 | Garrett et al. |
| 7,239,110 B2 | 7/2007 | Cheng et al. |
| 7,248,017 B2 | 7/2007 | Cheng et al. |
| 7,251,527 B2 | 7/2007 | Lyden |
| 7,288,918 B2 | 10/2007 | DiStefano |
| 7,340,304 B2 | 3/2008 | MacDonald |
| 7,375,492 B2 | 5/2008 | Calhoon et al. |
| 7,375,493 B2 | 5/2008 | Calhoon et al. |
| 7,378,817 B2 | 5/2008 | Calhoon et al. |
| 7,382,636 B2 | 6/2008 | Baarman et al. |
| 7,385,357 B2 | 6/2008 | Kuennen et al. |
| 7,443,135 B2 | 10/2008 | Cho |
| 7,462,951 B1 | 12/2008 | Baarman |
| 7,466,213 B2 | 12/2008 | Lobl et al. |
| 7,471,062 B2 | 12/2008 | Bruning |
| 7,474,058 B2 | 1/2009 | Baarman |
| 7,492,247 B2 | 2/2009 | Schmidt et al. |
| 7,514,818 B2 | 4/2009 | Abe et al. |
| 7,518,267 B2 | 4/2009 | Baarman |
| 7,521,890 B2 | 4/2009 | Lee et al. |
| 7,525,283 B2 | 4/2009 | Cheng et al. |
| 7,545,337 B2 | 6/2009 | Guenther |
| 7,554,316 B2 | 6/2009 | Stevens et al. |
| 7,599,743 B2 | 10/2009 | Hassler, Jr. et al. |
| 7,615,936 B2 | 11/2009 | Baarman et al. |
| 7,639,514 B2 | 12/2009 | Baarman |

(56) References Cited

U.S. PATENT DOCUMENTS

| | | |
|---|---|---|
| 7,741,734 B2 | 6/2010 | Joannopoulos et al. |
| 7,795,708 B2 | 9/2010 | Katti |
| 7,825,543 B2 | 11/2010 | Karalis et al. |
| 7,825,544 B2 | 11/2010 | Jansen et al. |
| 7,835,417 B2 | 11/2010 | Heideman et al. |
| 7,843,288 B2 | 11/2010 | Lee et al. |
| 7,844,306 B2 | 11/2010 | Shearer et al. |
| 7,863,859 B2 | 1/2011 | Soar |
| 7,880,337 B2 | 2/2011 | Farkas |
| 7,884,697 B2 | 2/2011 | Wei et al. |
| 7,885,050 B2 | 2/2011 | Lee |
| 7,919,886 B2 | 4/2011 | Tanaka |
| 7,923,870 B2 | 4/2011 | Jin |
| 7,932,798 B2 | 4/2011 | Tolle et al. |
| 7,948,209 B2 | 5/2011 | Jung |
| 7,952,322 B2 | 5/2011 | Partovi et al. |
| 7,963,941 B2 | 6/2011 | Wilk |
| 7,969,045 B2 | 6/2011 | Schmidt et al. |
| 7,994,880 B2 | 8/2011 | Chen et al. |
| 7,999,506 B1 | 8/2011 | Hollar et al. |
| 8,022,576 B2 | 9/2011 | Joannopoulos et al. |
| 8,035,255 B2 | 10/2011 | Kurs et al. |
| 8,076,800 B2 | 12/2011 | Joannopoulos et al. |
| 8,076,801 B2 | 12/2011 | Karalis et al. |
| 8,084,889 B2 | 12/2011 | Joannopoulos et al. |
| 8,097,983 B2 | 1/2012 | Karalis et al. |
| 8,106,539 B2 | 1/2012 | Schatz et al. |
| 8,115,448 B2 | 2/2012 | John |
| 8,131,378 B2 | 3/2012 | Greenberg et al. |
| 8,178,995 B2 | 5/2012 | Amano et al. |
| 8,193,769 B2 | 6/2012 | Azancot et al. |
| 8,212,414 B2 | 7/2012 | Howard et al. |
| 8,260,200 B2 | 9/2012 | Shimizu et al. |
| 8,304,935 B2 | 11/2012 | Karalis et al. |
| 8,324,759 B2 | 12/2012 | Karalis et al. |
| 8,334,620 B2 | 12/2012 | Park et al. |
| 8,362,651 B2 | 1/2013 | Hamam et al. |
| 8,395,282 B2 | 3/2013 | Joannopoulos et al. |
| 8,395,283 B2 | 3/2013 | Joannopoulos et al. |
| 8,400,017 B2 | 3/2013 | Kurs et al. |
| 8,400,018 B2 | 3/2013 | Joannopoulos et al. |
| 8,400,019 B2 | 3/2013 | Joannopoulos et al. |
| 8,400,020 B2 | 3/2013 | Joannopoulos et al. |
| 8,400,021 B2 | 3/2013 | Joannopoulos et al. |
| 8,400,022 B2 | 3/2013 | Joannopoulos et al. |
| 8,400,023 B2 | 3/2013 | Joannopoulos et al. |
| 8,400,024 B2 | 3/2013 | Joannopoulos et al. |
| 8,410,636 B2 | 4/2013 | Kurs et al. |
| 8,441,154 B2 | 5/2013 | Karalis et al. |
| 8,457,547 B2 | 6/2013 | Meskens |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,461,817 B2 | 6/2013 | Martin et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,157 B2 | 7/2013 | Cook et al. |
| 8,482,158 B2 | 7/2013 | Kurs et al. |
| 8,487,480 B1 | 7/2013 | Kesler et al. |
| 8,497,601 B2 | 7/2013 | Hall et al. |
| 8,552,592 B2 | 10/2013 | Schatz et al. |
| 8,569,914 B2 | 10/2013 | Karalis et al. |
| 8,587,153 B2 | 11/2013 | Schatz et al. |
| 8,587,155 B2 | 11/2013 | Giler et al. |
| 8,598,743 B2 | 12/2013 | Hall et al. |
| 8,618,696 B2 | 12/2013 | Karalis et al. |
| 8,629,578 B2 | 1/2014 | Kurs et al. |
| 8,643,326 B2 | 2/2014 | Campanella et al. |
| 2002/0032471 A1 | 3/2002 | Loftin et al. |
| 2002/0105343 A1 | 8/2002 | Scheible et al. |
| 2002/0118004 A1 | 8/2002 | Scheible et al. |
| 2002/0130642 A1 | 9/2002 | Ettes et al. |
| 2002/0167294 A1 | 11/2002 | Odaohhara |
| 2003/0038641 A1 | 2/2003 | Scheible |
| 2003/0062794 A1 | 4/2003 | Scheible et al. |
| 2003/0062980 A1 | 4/2003 | Scheible et al. |
| 2003/0071034 A1 | 4/2003 | Thompson et al. |
| 2003/0124050 A1 | 7/2003 | Yadav et al. |
| 2003/0126948 A1 | 7/2003 | Yadav et al. |
| 2003/0160590 A1 | 8/2003 | Schaefer et al. |
| 2003/0199778 A1 | 10/2003 | Mickle et al. |
| 2003/0214255 A1 | 11/2003 | Baarman et al. |
| 2004/0000974 A1 | 1/2004 | Odenaal et al. |
| 2004/0026998 A1 | 2/2004 | Henriott et al. |
| 2004/0100338 A1 | 5/2004 | Clark |
| 2004/0113847 A1 | 6/2004 | Qi et al. |
| 2004/0130425 A1 | 7/2004 | Dayan et al. |
| 2004/0130915 A1 | 7/2004 | Baarman |
| 2004/0130916 A1 | 7/2004 | Baarman |
| 2004/0142733 A1 | 7/2004 | Parise |
| 2004/0150934 A1 | 8/2004 | Baarman |
| 2004/0189246 A1 | 9/2004 | Bulai et al. |
| 2004/0201361 A1 | 10/2004 | Koh et al. |
| 2004/0222751 A1 | 11/2004 | Mollema et al. |
| 2004/0227057 A1 | 11/2004 | Tuominen et al. |
| 2004/0232845 A1 | 11/2004 | Baarman |
| 2004/0233043 A1 | 11/2004 | Yazawa et al. |
| 2004/0267501 A1 | 12/2004 | Freed et al. |
| 2005/0007067 A1 | 1/2005 | Baarman et al. |
| 2005/0021134 A1 | 1/2005 | Opie |
| 2005/0027192 A1 | 2/2005 | Govari et al. |
| 2005/0033382 A1 | 2/2005 | Single |
| 2005/0085873 A1 | 4/2005 | Gord et al. |
| 2005/0093475 A1 | 5/2005 | Kuennen et al. |
| 2005/0104064 A1 | 5/2005 | Hegarty et al. |
| 2005/0104453 A1 | 5/2005 | Vanderelli et al. |
| 2005/0116650 A1 | 6/2005 | Baarman |
| 2005/0116683 A1 | 6/2005 | Cheng et al. |
| 2005/0122058 A1 | 6/2005 | Baarman et al. |
| 2005/0122059 A1 | 6/2005 | Baarman et al. |
| 2005/0125093 A1 | 6/2005 | Kikuchi et al. |
| 2005/0127849 A1 | 6/2005 | Baarman et al. |
| 2005/0127850 A1 | 6/2005 | Baarman et al. |
| 2005/0127866 A1 | 6/2005 | Hamilton et al. |
| 2005/0135122 A1 | 6/2005 | Cheng et al. |
| 2005/0140482 A1 | 6/2005 | Cheng et al. |
| 2005/0151511 A1 | 7/2005 | Chary |
| 2005/0156560 A1 | 7/2005 | Shimaoka et al. |
| 2005/0189945 A1 | 9/2005 | Reiderman |
| 2005/0194926 A1 | 9/2005 | DiStefano |
| 2005/0253152 A1 | 11/2005 | Klimov et al. |
| 2005/0288739 A1 | 12/2005 | Hassler, Jr. et al. |
| 2005/0288740 A1 | 12/2005 | Hassler, Jr. et al. |
| 2005/0288741 A1 | 12/2005 | Hassler, Jr. et al. |
| 2005/0288742 A1 | 12/2005 | Giordano et al. |
| 2006/0001509 A1 | 1/2006 | Gibbs |
| 2006/0010902 A1 | 1/2006 | Trinh et al. |
| 2006/0022636 A1 | 2/2006 | Xian et al. |
| 2006/0053296 A1 | 3/2006 | Busboom et al. |
| 2006/0061323 A1 | 3/2006 | Cheng et al. |
| 2006/0066443 A1 | 3/2006 | Hall |
| 2006/0090956 A1 | 5/2006 | Peshkovskiy et al. |
| 2006/0132045 A1 | 6/2006 | Baarman |
| 2006/0164866 A1 | 7/2006 | Vanderelli et al. |
| 2006/0181242 A1 | 8/2006 | Freed et al. |
| 2006/0184209 A1 | 8/2006 | John et al. |
| 2006/0184210 A1 | 8/2006 | Singhal et al. |
| 2006/0185809 A1 | 8/2006 | Elfrink et al. |
| 2006/0199620 A1 | 9/2006 | Greene et al. |
| 2006/0202665 A1 | 9/2006 | Hsu |
| 2006/0205381 A1 | 9/2006 | Beart et al. |
| 2006/0214626 A1 | 9/2006 | Nilson et al. |
| 2006/0219448 A1 | 10/2006 | Grieve et al. |
| 2006/0238365 A1 | 10/2006 | Vecchione et al. |
| 2006/0270440 A1 | 11/2006 | Shearer et al. |
| 2006/0281435 A1 | 12/2006 | Shearer et al. |
| 2007/0010295 A1 | 1/2007 | Greene et al. |
| 2007/0013483 A1 | 1/2007 | Stewart |
| 2007/0016089 A1 | 1/2007 | Fischell et al. |
| 2007/0021140 A1 | 1/2007 | Keyes, IV et al. |
| 2007/0024246 A1 | 2/2007 | Flaugher |
| 2007/0064406 A1 | 3/2007 | Beart |

(56) References Cited

U.S. PATENT DOCUMENTS

| | | |
|---|---|---|
| 2007/0069687 A1 | 3/2007 | Suzuki |
| 2007/0096875 A1 | 5/2007 | Waterhouse et al. |
| 2007/0105429 A1 | 5/2007 | Kohl et al. |
| 2007/0117596 A1 | 5/2007 | Greene et al. |
| 2007/0126650 A1 | 6/2007 | Guenther |
| 2007/0145830 A1 | 6/2007 | Lee et al. |
| 2007/0164839 A1 | 7/2007 | Naito |
| 2007/0171681 A1 | 7/2007 | Baarman |
| 2007/0176840 A1 | 8/2007 | Pristas et al. |
| 2007/0178945 A1 | 8/2007 | Cook et al. |
| 2007/0182367 A1 | 8/2007 | Partovi |
| 2007/0208263 A1 | 9/2007 | John et al. |
| 2007/0222542 A1 | 9/2007 | Joannopoulos et al. |
| 2007/0257636 A1 | 11/2007 | Phillips et al. |
| 2007/0267918 A1 | 11/2007 | Gyland |
| 2007/0276538 A1 | 11/2007 | Kjellsson et al. |
| 2008/0012569 A1 | 1/2008 | Hall et al. |
| 2008/0014897 A1 | 1/2008 | Cook et al. |
| 2008/0030415 A1 | 2/2008 | Homan et al. |
| 2008/0036588 A1 | 2/2008 | Iverson et al. |
| 2008/0047727 A1 | 2/2008 | Sexton et al. |
| 2008/0051854 A1 | 2/2008 | Bulkes et al. |
| 2008/0067874 A1 | 3/2008 | Tseng |
| 2008/0132909 A1 | 6/2008 | Jascob et al. |
| 2008/0154331 A1 | 6/2008 | John et al. |
| 2008/0172109 A1* | 7/2008 | Rahman ............. A61N 1/37229 607/60 |
| 2008/0176521 A1 | 7/2008 | Singh et al. |
| 2008/0191638 A1 | 8/2008 | Kuennen et al. |
| 2008/0197710 A1 | 8/2008 | Kreitz et al. |
| 2008/0197802 A1 | 8/2008 | Onishi et al. |
| 2008/0211320 A1 | 9/2008 | Cook et al. |
| 2008/0238364 A1 | 10/2008 | Weber et al. |
| 2008/0255901 A1 | 10/2008 | Carroll et al. |
| 2008/0265684 A1 | 10/2008 | Farkas |
| 2008/0266748 A1 | 10/2008 | Lee |
| 2008/0272860 A1 | 11/2008 | Pance |
| 2008/0273242 A1 | 11/2008 | Woodgate et al. |
| 2008/0278264 A1 | 11/2008 | Karalis et al. |
| 2008/0291277 A1 | 11/2008 | Jacobsen et al. |
| 2008/0300657 A1 | 12/2008 | Stultz |
| 2008/0300660 A1 | 12/2008 | John |
| 2009/0010028 A1 | 1/2009 | Baarmen et al. |
| 2009/0015075 A1 | 1/2009 | Cook et al. |
| 2009/0033280 A1 | 2/2009 | Choi et al. |
| 2009/0033564 A1 | 2/2009 | Cook et al. |
| 2009/0038623 A1 | 2/2009 | Farbarik et al. |
| 2009/0045772 A1 | 2/2009 | Cook et al. |
| 2009/0051224 A1 | 2/2009 | Cook et al. |
| 2009/0058189 A1 | 3/2009 | Cook et al. |
| 2009/0058361 A1 | 3/2009 | John |
| 2009/0067198 A1 | 3/2009 | Graham et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0072782 A1 | 3/2009 | Randall |
| 2009/0079268 A1 | 3/2009 | Cook et al. |
| 2009/0079387 A1 | 3/2009 | Jin et al. |
| 2009/0085408 A1 | 4/2009 | Bruhn |
| 2009/0085706 A1 | 4/2009 | Baarman et al. |
| 2009/0096413 A1 | 4/2009 | Patovi et al. |
| 2009/0102292 A1 | 4/2009 | Cook et al. |
| 2009/0108679 A1 | 4/2009 | Porwal |
| 2009/0108997 A1 | 4/2009 | Patterson et al. |
| 2009/0115628 A1 | 5/2009 | Dicks et al. |
| 2009/0127937 A1 | 5/2009 | Widmer et al. |
| 2009/0134712 A1 | 5/2009 | Cook et al. |
| 2009/0146892 A1 | 6/2009 | Shimizu et al. |
| 2009/0153273 A1 | 6/2009 | Chen |
| 2009/0160261 A1 | 6/2009 | Elo |
| 2009/0161078 A1 | 6/2009 | Wu et al. |
| 2009/0167449 A1 | 7/2009 | Cook et al. |
| 2009/0174263 A1 | 7/2009 | Baarman et al. |
| 2009/0179502 A1 | 7/2009 | Cook et al. |
| 2009/0188396 A1 | 7/2009 | Hofmann et al. |
| 2009/0189458 A1 | 7/2009 | Kawasaki |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0218884 A1 | 9/2009 | Soar |
| 2009/0224608 A1 | 9/2009 | Cook et al. |
| 2009/0224609 A1 | 9/2009 | Cook et al. |
| 2009/0224723 A1 | 9/2009 | Tanabe |
| 2009/0224856 A1 | 9/2009 | Karalis et al. |
| 2009/0230777 A1 | 9/2009 | Baarman et al. |
| 2009/0237194 A1 | 9/2009 | Waffenschmidt et al. |
| 2009/0243394 A1 | 10/2009 | Levine |
| 2009/0243397 A1 | 10/2009 | Cook et al. |
| 2009/0251008 A1 | 10/2009 | Sugaya |
| 2009/0261778 A1 | 10/2009 | Kook |
| 2009/0267558 A1 | 10/2009 | Jung |
| 2009/0267709 A1 | 10/2009 | Joannopoulos et al. |
| 2009/0267710 A1 | 10/2009 | Joannopoulos et al. |
| 2009/0271047 A1 | 10/2009 | Wakamatsu |
| 2009/0271048 A1 | 10/2009 | Wakamatsu |
| 2009/0273242 A1 | 11/2009 | Cook |
| 2009/0273318 A1 | 11/2009 | Rondoni et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284218 A1 | 11/2009 | Mohammadian et al. |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2009/0289595 A1 | 11/2009 | Chen et al. |
| 2009/0299918 A1 | 12/2009 | Cook et al. |
| 2009/0308933 A1 | 12/2009 | Osada |
| 2009/0322158 A1 | 12/2009 | Stevens et al. |
| 2009/0322280 A1 | 12/2009 | Kamijo et al. |
| 2010/0015918 A1 | 1/2010 | Liu et al. |
| 2010/0017249 A1 | 1/2010 | Fincham et al. |
| 2010/0033021 A1 | 2/2010 | Bennett |
| 2010/0034238 A1 | 2/2010 | Bennett |
| 2010/0036773 A1 | 2/2010 | Bennett |
| 2010/0038970 A1 | 2/2010 | Cook et al. |
| 2010/0045114 A1 | 2/2010 | Sample et al. |
| 2010/0052431 A1 | 3/2010 | Mita |
| 2010/0052811 A1 | 3/2010 | Smith et al. |
| 2010/0060077 A1 | 3/2010 | Paulus et al. |
| 2010/0065352 A1 | 3/2010 | Ichikawa |
| 2010/0066349 A1 | 3/2010 | Lin et al. |
| 2010/0076524 A1 | 3/2010 | Forsberg et al. |
| 2010/0081379 A1 | 4/2010 | Cooper et al. |
| 2010/0094381 A1 | 4/2010 | Kim et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0104031 A1 | 4/2010 | Lacour |
| 2010/0109443 A1 | 5/2010 | Cook et al. |
| 2010/0109445 A1 | 5/2010 | Kurs et al. |
| 2010/0109604 A1 | 5/2010 | Boys et al. |
| 2010/0115474 A1 | 5/2010 | Takada et al. |
| 2010/0117454 A1 | 5/2010 | Cook et al. |
| 2010/0117455 A1 | 5/2010 | Joannopoulos et al. |
| 2010/0117456 A1 | 5/2010 | Karalis et al. |
| 2010/0117596 A1 | 5/2010 | Cook et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0123452 A1 | 5/2010 | Amano et al. |
| 2010/0123530 A1 | 5/2010 | Park et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0127660 A1 | 5/2010 | Cook et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |

(56) References Cited

U.S. PATENT DOCUMENTS

| | | |
|---|---|---|
| 2010/0141042 A1 | 6/2010 | Kesler et al. |
| 2010/0148589 A1 | 6/2010 | Hamam et al. |
| 2010/0148723 A1 | 6/2010 | Cook et al. |
| 2010/0151808 A1 | 6/2010 | Toncich et al. |
| 2010/0156346 A1 | 6/2010 | Takada et al. |
| 2010/0156355 A1 | 6/2010 | Bauerle et al. |
| 2010/0156570 A1 | 6/2010 | Hong et al. |
| 2010/0164295 A1 | 7/2010 | Ichikawa et al. |
| 2010/0164296 A1 | 7/2010 | Kurs |
| 2010/0164297 A1 | 7/2010 | Kurs et al. |
| 2010/0164298 A1 | 7/2010 | Karalis et al. |
| 2010/0171368 A1 | 7/2010 | Schatz et al. |
| 2010/0171370 A1 | 7/2010 | Karalis et al. |
| 2010/0179384 A1 | 7/2010 | Hoeg et al. |
| 2010/0181843 A1 | 7/2010 | Schatz et al. |
| 2010/0181844 A1 | 7/2010 | Karalis et al. |
| 2010/0181845 A1 | 7/2010 | Fiorello et al. |
| 2010/0181961 A1 | 7/2010 | Novak et al. |
| 2010/0181964 A1 | 7/2010 | Huggins et al. |
| 2010/0184371 A1 | 7/2010 | Cook et al. |
| 2010/0187911 A1 | 7/2010 | Joannopoulos et al. |
| 2010/0187913 A1 | 7/2010 | Sample |
| 2010/0188183 A1 | 7/2010 | Shpiro |
| 2010/0190435 A1 | 7/2010 | Cook et al. |
| 2010/0190436 A1 | 7/2010 | Cook et al. |
| 2010/0194206 A1 | 8/2010 | Burdo et al. |
| 2010/0194207 A1 | 8/2010 | Graham |
| 2010/0194334 A1 | 8/2010 | Kirby et al. |
| 2010/0194335 A1 | 8/2010 | Kirby et al. |
| 2010/0201189 A1 | 8/2010 | Kirby et al. |
| 2010/0201201 A1 | 8/2010 | Mobarhan et al. |
| 2010/0201202 A1 | 8/2010 | Kirby et al. |
| 2010/0201203 A1 | 8/2010 | Schatz et al. |
| 2010/0201204 A1 | 8/2010 | Sakoda et al. |
| 2010/0201205 A1 | 8/2010 | Karalis et al. |
| 2010/0201310 A1 | 8/2010 | Vorenkamp et al. |
| 2010/0201312 A1 | 8/2010 | Kirby et al. |
| 2010/0201313 A1 | 8/2010 | Vorenkamp et al. |
| 2010/0201316 A1 | 8/2010 | Takada et al. |
| 2010/0201513 A1 | 8/2010 | Vorenkamp et al. |
| 2010/0207458 A1 | 8/2010 | Joannopoulos et al. |
| 2010/0210233 A1 | 8/2010 | Cook et al. |
| 2010/0213770 A1 | 8/2010 | Kikuchi |
| 2010/0213895 A1 | 8/2010 | Keating et al. |
| 2010/0217553 A1 | 8/2010 | Von Novak et al. |
| 2010/0219694 A1 | 9/2010 | Kurs et al. |
| 2010/0219695 A1 | 9/2010 | Komiyama et al. |
| 2010/0219696 A1 | 9/2010 | Kojima |
| 2010/0222010 A1 | 9/2010 | Ozaki et al. |
| 2010/0225175 A1 | 9/2010 | Karalis et al. |
| 2010/0225270 A1 | 9/2010 | Jacobs et al. |
| 2010/0225271 A1 | 9/2010 | Oyobe et al. |
| 2010/0225272 A1 | 9/2010 | Kirby et al. |
| 2010/0231053 A1 | 9/2010 | Karalis et al. |
| 2010/0231163 A1 | 9/2010 | Mashinsky |
| 2010/0231340 A1 | 9/2010 | Fiorello et al. |
| 2010/0234922 A1 | 9/2010 | Forsell |
| 2010/0235006 A1 | 9/2010 | Brown |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0237709 A1 | 9/2010 | Hall et al. |
| 2010/0244576 A1 | 9/2010 | Hillan et al. |
| 2010/0244577 A1 | 9/2010 | Shimokawa |
| 2010/0244578 A1 | 9/2010 | Yoshikawa |
| 2010/0244579 A1 | 9/2010 | Sogabe et al. |
| 2010/0244580 A1 | 9/2010 | Uchida et al. |
| 2010/0244581 A1 | 9/2010 | Uchida |
| 2010/0244582 A1 | 9/2010 | Yoshikawa |
| 2010/0244583 A1 | 9/2010 | Shimokawa |
| 2010/0244767 A1 | 9/2010 | Turner et al. |
| 2010/0244839 A1 | 9/2010 | Yoshikawa |
| 2010/0248622 A1 | 9/2010 | Kirby et al. |
| 2010/0253152 A1 | 10/2010 | Karalis et al. |
| 2010/0253281 A1 | 10/2010 | Li |
| 2010/0256481 A1 | 10/2010 | Mareci et al. |
| 2010/0256831 A1 | 10/2010 | Abramo et al. |
| 2010/0259108 A1 | 10/2010 | Giler et al. |
| 2010/0259109 A1 | 10/2010 | Sato |
| 2010/0259110 A1 | 10/2010 | Kurs et al. |
| 2010/0264745 A1 | 10/2010 | Karalis et al. |
| 2010/0264746 A1 | 10/2010 | Kazama et al. |
| 2010/0264747 A1 | 10/2010 | Hall et al. |
| 2010/0276995 A1 | 11/2010 | Marzetta et al. |
| 2010/0277003 A1 | 11/2010 | Von Novak et al. |
| 2010/0277004 A1 | 11/2010 | Suzuki et al. |
| 2010/0277005 A1 | 11/2010 | Karalis et al. |
| 2010/0277120 A1 | 11/2010 | Cook et al. |
| 2010/0277121 A1 | 11/2010 | Hall |
| 2010/0289341 A1 | 11/2010 | Ozaki et al. |
| 2010/0289449 A1 | 11/2010 | Elo |
| 2010/0295505 A1 | 11/2010 | Jung et al. |
| 2010/0295506 A1 | 11/2010 | Ichikawa |
| 2010/0308939 A1 | 12/2010 | Kurs |
| 2010/0314946 A1 | 12/2010 | Budde et al. |
| 2010/0327660 A1 | 12/2010 | Karalis et al. |
| 2010/0327661 A1 | 12/2010 | Karalis et al. |
| 2010/0328044 A1 | 12/2010 | Waffenschmidt et al. |
| 2011/0004269 A1 | 1/2011 | Strother et al. |
| 2011/0012431 A1 | 1/2011 | Karalis et al. |
| 2011/0018361 A1 | 1/2011 | Karalis et al. |
| 2011/0025131 A1 | 2/2011 | Karalis et al. |
| 2011/0031928 A1 | 2/2011 | Soar |
| 2011/0043046 A1 | 2/2011 | Joannopoulos et al. |
| 2011/0043047 A1 | 2/2011 | Karalis et al. |
| 2011/0043048 A1 | 2/2011 | Karalis et al. |
| 2011/0043049 A1 | 2/2011 | Karalis et al. |
| 2011/0049995 A1 | 3/2011 | Hashiguchi |
| 2011/0049996 A1 | 3/2011 | Karalis et al. |
| 2011/0049998 A1 | 3/2011 | Karalis et al. |
| 2011/0074218 A1 | 3/2011 | Karalis et al. |
| 2011/0074346 A1 | 3/2011 | Hall et al. |
| 2011/0074347 A1 | 3/2011 | Karalis et al. |
| 2011/0089895 A1 | 4/2011 | Karalis et al. |
| 2011/0095618 A1 | 4/2011 | Schatz et al. |
| 2011/0115303 A1 | 5/2011 | Baarman et al. |
| 2011/0115431 A1 | 5/2011 | Dunworth et al. |
| 2011/0121920 A1 | 5/2011 | Kurs et al. |
| 2011/0128015 A1 | 6/2011 | Dorairaj et al. |
| 2011/0140544 A1 | 6/2011 | Karalis et al. |
| 2011/0148219 A1 | 6/2011 | Karalis et al. |
| 2011/0162895 A1 | 7/2011 | Karalis et al. |
| 2011/0169339 A1 | 7/2011 | Karalis et al. |
| 2011/0181122 A1 | 7/2011 | Karalis et al. |
| 2011/0193416 A1 | 8/2011 | Campanella et al. |
| 2011/0193419 A1 | 8/2011 | Karalis et al. |
| 2011/0198939 A1 | 8/2011 | Karalis et al. |
| 2011/0215086 A1 | 9/2011 | Yeh |
| 2011/0221278 A1 | 9/2011 | Karalis et al. |
| 2011/0227528 A1 | 9/2011 | Karalis et al. |
| 2011/0227530 A1 | 9/2011 | Karalis et al. |
| 2011/0241618 A1 | 10/2011 | Karalis et al. |
| 2011/0248573 A1 | 10/2011 | Kanno et al. |
| 2011/0254377 A1 | 10/2011 | Wildmer et al. |
| 2011/0254503 A1 | 10/2011 | Widmer et al. |
| 2011/0266878 A9 | 11/2011 | Cook et al. |
| 2011/0278943 A1 | 11/2011 | Eckhoff et al. |
| 2012/0001492 A9 | 1/2012 | Cook et al. |
| 2012/0001593 A1 | 1/2012 | DiGuardo |
| 2012/0007435 A1 | 1/2012 | Sada et al. |
| 2012/0007441 A1 | 1/2012 | John et al. |
| 2012/0025602 A1 | 2/2012 | Boys et al. |
| 2012/0032522 A1 | 2/2012 | Schatz et al. |
| 2012/0038525 A1 | 2/2012 | Monsalve Carcelen et al. |
| 2012/0062345 A1 | 3/2012 | Kurs et al. |
| 2012/0068549 A1 | 3/2012 | Karalis et al. |
| 2012/0086284 A1 | 4/2012 | Campanella et al. |
| 2012/0086867 A1 | 4/2012 | Kesler et al. |
| 2012/0091794 A1 | 4/2012 | Campanella et al. |
| 2012/0091795 A1 | 4/2012 | Fiorello et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |

(56) References Cited

U.S. PATENT DOCUMENTS

| | | |
|---|---|---|
| 2012/0091949 A1 | 4/2012 | Campanella et al. |
| 2012/0091950 A1 | 4/2012 | Campanella et al. |
| 2012/0098350 A1 | 4/2012 | Campanella et al. |
| 2012/0112531 A1 | 5/2012 | Kesler et al. |
| 2012/0112532 A1 | 5/2012 | Kesler et al. |
| 2012/0112534 A1 | 5/2012 | Kesler et al. |
| 2012/0112535 A1 | 5/2012 | Karalis et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0119569 A1 | 5/2012 | Karalis et al. |
| 2012/0119575 A1 | 5/2012 | Kurs et al. |
| 2012/0119576 A1 | 5/2012 | Kesler et al. |
| 2012/0119698 A1 | 5/2012 | Karalis et al. |
| 2012/0139355 A1 | 6/2012 | Ganem et al. |
| 2012/0146575 A1 | 6/2012 | Armstrong et al. |
| 2012/0153732 A1 | 6/2012 | Kurs et al. |
| 2012/0153733 A1 | 6/2012 | Schatz et al. |
| 2012/0153734 A1 | 6/2012 | Kurs et al. |
| 2012/0153735 A1 | 6/2012 | Karalis et al. |
| 2012/0153736 A1 | 6/2012 | Karalis et al. |
| 2012/0153737 A1 | 6/2012 | Karalis et al. |
| 2012/0153738 A1 | 6/2012 | Karalis et al. |
| 2012/0153893 A1 | 6/2012 | Schatz et al. |
| 2012/0184338 A1 | 7/2012 | Kesler et al. |
| 2012/0206096 A1 | 8/2012 | John |
| 2012/0223573 A1 | 9/2012 | Schatz et al. |
| 2012/0228952 A1 | 9/2012 | Hall et al. |
| 2012/0228953 A1 | 9/2012 | Kesler et al. |
| 2012/0228954 A1 | 9/2012 | Kesler et al. |
| 2012/0235500 A1 | 9/2012 | Ganem et al. |
| 2012/0235501 A1 | 9/2012 | Kesler et al. |
| 2012/0235502 A1 | 9/2012 | Kesler et al. |
| 2012/0235503 A1 | 9/2012 | Kesler et al. |
| 2012/0235504 A1 | 9/2012 | Kesler et al. |
| 2012/0235505 A1 | 9/2012 | Schatz et al. |
| 2012/0235566 A1 | 9/2012 | Karalis et al. |
| 2012/0235567 A1 | 9/2012 | Karalis et al. |
| 2012/0235633 A1 | 9/2012 | Kesler et al. |
| 2012/0235634 A1 | 9/2012 | Hall et al. |
| 2012/0239117 A1 | 9/2012 | Kesler et al. |
| 2012/0242159 A1 | 9/2012 | Lou et al. |
| 2012/0242225 A1 | 9/2012 | Karalis et al. |
| 2012/0248884 A1 | 10/2012 | Karalis et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |
| 2012/0256494 A1 | 10/2012 | Kesler et al. |
| 2012/0267960 A1 | 10/2012 | Low et al. |
| 2012/0280765 A1 | 11/2012 | Kurs et al. |
| 2012/0313449 A1 | 12/2012 | Kurs et al. |
| 2012/0313742 A1 | 12/2012 | Kurs et al. |
| 2013/0007949 A1 | 1/2013 | Kurs et al. |
| 2013/0020878 A1 | 1/2013 | Karalis et al. |
| 2013/0033118 A1 | 2/2013 | Karalis et al. |
| 2013/0038402 A1 | 2/2013 | Karalis et al. |
| 2013/0057364 A1 | 3/2013 | Kesler et al. |
| 2013/0062966 A1 | 3/2013 | Verghese et al. |
| 2013/0069441 A1 | 3/2013 | Verghese et al. |
| 2013/0069753 A1 | 3/2013 | Kurs et al. |
| 2013/0099587 A1 | 4/2013 | Lou et al. |
| 2013/0154383 A1 | 6/2013 | Kasturi et al. |
| 2013/0154389 A1 | 6/2013 | Kurs et al. |
| 2013/0159956 A1 | 6/2013 | Verghese et al. |
| 2013/0175874 A1 | 7/2013 | Lou et al. |
| 2013/0175875 A1 | 7/2013 | Kurs et al. |
| 2013/0200716 A1 | 8/2013 | Kesler et al. |
| 2013/0200721 A1 | 8/2013 | Kurs et al. |
| 2013/0221744 A1 | 8/2013 | Hall et al. |
| 2013/0278073 A1 | 10/2013 | Kurs et al. |
| 2013/0278074 A1 | 10/2013 | Kurs et al. |
| 2013/0278075 A1 | 10/2013 | Kurs et al. |
| 2013/0300353 A1 | 11/2013 | Kurs et al. |
| 2013/0307349 A1 | 11/2013 | Hall et al. |
| 2013/0320773 A1 | 12/2013 | Schatz et al. |
| 2013/0334892 A1 | 12/2013 | Hall et al. |
| 2014/0002012 A1 | 1/2014 | McCauley et al. |
| 2014/0070764 A1* | 3/2014 | Keeling .................. H02J 50/12 320/108 |
| 2014/0125140 A1* | 5/2014 | Widmer .................. H02J 7/025 307/104 |
| 2015/0311728 A1* | 10/2015 | Yun .......................... H02J 5/005 307/104 |
| 2015/0333801 A1* | 11/2015 | Hosotani ................. H01F 38/14 307/104 |
| 2016/0189848 A1* | 6/2016 | Nam ....................... H01F 38/14 307/104 |
| 2016/0243949 A1* | 8/2016 | Merkel .................... H02J 7/025 |
| 2016/0285317 A1* | 9/2016 | Maniktala ............... H02J 50/12 |

FOREIGN PATENT DOCUMENTS

| | | |
|---|---|---|
| CN | 102439669 | 5/2012 |
| CN | 103329397 | 9/2013 |
| DE | 38 24 972 | 1/1989 |
| DE | 100 29147 | 12/2001 |
| DE | 200 16 655 | 3/2002 |
| DE | 102 21 484 | 11/2003 |
| DE | 103 04 584 | 8/2004 |
| DE | 10 2005 036290 | 2/2007 |
| DE | 10 2006 044057 | 4/2008 |
| EP | 1 335 477 | 8/2003 |
| EP | 1 521 206 | 4/2005 |
| EP | 1 524 010 | 4/2005 |
| EP | 2 357 716 | 8/2011 |
| JP | 02-097005 | 4/1990 |
| JP | 4-265875 | 9/1992 |
| JP | 6-341410 | 12/1994 |
| JP | 9-182323 | 7/1997 |
| JP | 9-298847 | 11/1997 |
| JP | 10-164837 | 6/1998 |
| JP | 11-75329 | 3/1999 |
| JP | 11-188113 | 7/1999 |
| JP | 2001-309580 | 11/2001 |
| JP | 2002-010535 | 1/2002 |
| JP | 2003-179526 | 6/2003 |
| JP | 2004-166459 | 6/2004 |
| JP | 2004-201458 | 7/2004 |
| JP | 2004-229144 | 8/2004 |
| JP | 2005-57444 | 3/2005 |
| JP | 2005-149238 | 6/2005 |
| JP | 2006-074848 | 3/2006 |
| JP | 2007-505480 | 3/2007 |
| JP | 2007-266892 | 10/2007 |
| JP | 2007-537637 | 12/2007 |
| JP | 2008-508842 | 3/2008 |
| JP | 2008-206231 | 9/2008 |
| JP | 2008-206327 | 9/2008 |
| JP | 2011-072074 | 4/2011 |
| JP | 2012-504387 | 2/2012 |
| JP | 2013-543718 | 12/2013 |
| KR | 10-2007-0017804 | 2/2007 |
| KR | 10-2008-0007635 | 1/2008 |
| KR | 10-2009-0122072 | 11/2009 |
| KR | 10-2011-0050920 | 5/2011 |
| SG | 112842 | 7/2005 |
| WO | WO 92/17929 | 10/1992 |
| WO | WO 93/23908 | 11/1993 |
| WO | WO 94/28560 | 12/1994 |
| WO | WO 95/11545 | 4/1995 |
| WO | WO 96/02970 | 2/1996 |
| WO | WO 98/50993 | 11/1998 |
| WO | WO 00/77910 | 12/2000 |
| WO | WO 03/092329 | 11/2003 |
| WO | WO 03/096361 | 11/2003 |
| WO | WO 03/096512 | 11/2003 |
| WO | WO 2004/015885 | 2/2004 |
| WO | WO 2004/038888 | 5/2004 |
| WO | WO 2004/055654 | 7/2004 |
| WO | WO 2004/073150 | 8/2004 |
| WO | WO 2004/073166 | 8/2004 |
| WO | WO 2004/073176 | 8/2004 |

(56) References Cited

FOREIGN PATENT DOCUMENTS

| | | |
|---|---|---|
| WO | WO 2004/073177 | 8/2004 |
| WO | WO 2004/112216 | 12/2004 |
| WO | WO 2005/024865 | 3/2005 |
| WO | WO 2005/060068 | 6/2005 |
| WO | WO 2005/109597 | 11/2005 |
| WO | WO 2005/109598 | 11/2005 |
| WO | WO 2006/011769 | 2/2006 |
| WO | WO 2007/008646 | 1/2007 |
| WO | WO 2007/020583 | 2/2007 |
| WO | WO 2007/042952 | 4/2007 |
| WO | WO 2007/084716 | 7/2007 |
| WO | WO 2007/084717 | 7/2007 |
| WO | WO 2008/109489 | 9/2008 |
| WO | WO 2008/118178 | 10/2008 |
| WO | WO 2009/009559 | 1/2009 |
| WO | WO 2009/018568 | 2/2009 |
| WO | WO 2009/023155 | 2/2009 |
| WO | WO 2009/023646 | 2/2009 |
| WO | WO 2009/033043 | 3/2009 |
| WO | WO 2009/062438 | 5/2009 |
| WO | WO 2009/070730 | 6/2009 |
| WO | WO 2009/126963 | 10/2009 |
| WO | WO 2009/140506 | 11/2009 |
| WO | WO 2009/149464 | 12/2009 |
| WO | WO 2009/155000 | 12/2009 |
| WO | WO 2010/030977 | 3/2010 |
| WO | WO 2010/036980 | 4/2010 |
| WO | WO 2010/039967 | 4/2010 |
| WO | WO 2010/090538 | 8/2010 |
| WO | WO 2010/090539 | 8/2010 |
| WO | WO 2010/093997 | 8/2010 |
| WO | WO 2010/104569 | 9/2010 |
| WO | WO 2011/061388 | 5/2011 |
| WO | WO 2011/061821 | 5/2011 |
| WO | WO 2011/062827 | 5/2011 |
| WO | WO 2011/112795 | 9/2011 |
| WO | WO 2012/037279 | 3/2012 |
| WO | WO 2012/170278 | 12/2012 |
| WO | WO 2013/013235 | 1/2013 |
| WO | WO 2013/020138 | 2/2013 |
| WO | WO 2013/036947 | 3/2013 |
| WO | WO 2013/059441 | 4/2013 |
| WO | WO 2013/067484 | 5/2013 |
| WO | WO 2013/113017 | 8/2013 |
| WO | WO 2013/142840 | 9/2013 |
| WO | WO 2014/004843 | 1/2014 |

OTHER PUBLICATIONS

"Physics Update, Unwired Energy", *Physics Today*, pp. 26, (Jan. 2007) (See http://arxiv.org/abs/physics/0611063.).
"In pictures: A year in technology", *BBC News*, (Dec. 28, 2007).
"Next Little Thing 2010 Electricity without wires", CNN Money (See money.cnn.com/galleries/2009/smallbusiness/0911/gallery.next_little_thing_2010.smb/) (dated Nov. 30, 2009).
Abe et al. "A Noncontact Charger Using a Resonant Converter with Parallel Capacitor of the Secondary Coil". IEEE, 36(2):444-451, Mar./Apr. 2000.
Ahmadian, M. et al., "Miniature Transmitter for Implantable Micro Systems", *Proceedings of the 25th Annual International Conference of the IEEE EMBS Cancun, Mexico*, pp. 3028-3031 (Sep. 17-21, 2003).
Aoki, T. et al., "Observation of strong coupling between one atom and a monolithic microresonator", Nature, vol. 443:671-674 (2006).
Apneseth et al. "Introducing wireless proximity switches" ABB Review Apr. 2002.
Aristeidis Karalis et al., "Efficient Wireless non-radiative mid-range energy transfer", *Annals of Physics*, vol. 323, pp. 34-48 (2008).
Baker et al., "Feedback Analysis and Design of RF Power Links for Low-Power Bionic Systems," *IEEE Transactions on Biomedical Circuits and Systems*, vol. 1(1):28-38 (Mar. 2007).
Balanis, C.A., "Antenna Theory: Analysis and Design," 3rd Edition, Sections 4.2, 4.3, 5.2, 5.3 (Wiley, New Jersey, 2005).

Berardelli, P., "Outlets Are Out", ScienceNOW Daily News, Science Now, http://sciencenow.sciencemag.org/ cgi/content/full/2006/1114/2, (Nov. 14, 2006) 2 pages.
Biever, C., "Evanescent coupling could power gadgets wirelessly", NewScientistsTech.com, http://www. newscientisttech.com/article.ns?id=dnl 0575&print=true, (Nov. 15, 2006) 2 pages.
Borenstein, S., "Man tries wirelessly boosting batteries", (The Associated Press), USA Today, (Nov. 16, 2006) 1 page.
Borenstein, S., "Man tries wirelessly boosting batteries", AP Science Writer, Boston.com, (See http://www.boston.com/business/technology/articles/2006/11/15/man_tries_wirelessly_b . . . ) (Nov. 15, 2006).
Boyle, A., "Electro-nirvana? Not so fast", MSNBC, http://lcosmiclog.msnbc.msn.com/_news/2007/06/08/4350760-electro-nirvana-not-so-fast, (Jun. 8, 2007) 1 page.
Budhia, M. et al., "A New IPT Magnetic Coupler for Electric Vehicle Charging Systems", IECON 2010—36th Annual Conference on IEEE Industrial Electronics Society, Glendale, AZ, pp. 2487-2492 (Nov. 7-10, 2010).
Budhia, M. et al., "Development and evaluation of single sided flux couplers for contactless electric vehicle charging", 2011 IEEE Energy Conversion Congress and Exposition (ECCE), Phoenix, AZ, pp. 614-621 (Sep. 17-22, 2011).
Budhia, M. et al.,"Development of a Single-Sided Flux Magnetic Coupler for Electric Vehicle IPT", *IEEE Transactions on Industrial Electronics*, vol. 60:318-328 (Jan. 2013).
Bulkeley, W. M., "MIT Scientists Pave the Way for Wireless Battery Charging", The Wall Street Journal (See http://online.wsj.com/articles/SB118123955549228045.html?mod=googlenews_wsj), (Jun. 8, 2007) 2 pages.
Burri et al., "Invention Description", (Feb. 5, 2008).
Cass, S., "Air Power—Wireless data connections are common—now scientists are working on wireless power", Sponsored by IEEE Spectrum, http://spectrum.ieee.org/computing/hardware/air-power, (Nov. 2006) 2 pages.
Castelvecchi, Davide, "The Power of Induction—Cutting the last cord could resonate with our increasingly gadget dependent lives", *Science News Online*, vol. 172, No. 3, Jul. 21, 2007, 6 pages.
Chang, A., "Recharging the Wireless Way—Even physicists forget to recharge their cell phones sometimes.", PC Magazine, ABC News Internet Ventures, (Dec. 12, 2006) 1 page.
Chinaview,, "Scientists light bulb with 'wireless electricity'",www.Chinaview.cn, http://news.xinhuanet.com/english/2007-06/08/content_6215681.htm,Jun. 2007,1 page.
Cooks, G., "The vision of an MIT physicist: Getting rid of pesky rechargers", Boston.com, (Dec. 11, 2006) 1 page.
Derbyshire, D., "The end of the plug? Scientists invent wireless device that beams electricity through your home", Daily Mail, http://www.dailymail.co.uk/pages/live/articles/technology/technology.html?in_article_id=4 . . . ), (Jun. 7, 2007) 3 pages.
Eisenberg, Anne, "Automatic Recharging, From a Distance", The New York Times, (see www.nytimes.com/2012/03/11/business/built-in-wireless-chargeing-for-electronic-devices.html?_r=0) (published on Mar. 10, 2012).
Esser et al., "A New Approach to Power Supplies for Robots", IEEE, vol. 27(5):872-875, (Sep./Oct. 1991).
Fan, Shanhui et al., "Rate-Equation Analysis of Output Efficiency and Modulation Rate of Photomic-Crystal Light-Emitting Diodes", IEEE Journal of Quantum Electronics, vol. 36(10):1123-1130 (Oct. 2000).
Fenske et al., "Dielectric Materials at Microwave Frequencies", Applied Microwave & Wireless, pp. 92-100 (2000).
Fernandez, C. et al., "A simple dc-dc converter for the power supply of a cochlear implant", IEEE, pp. 1965-1970 (2003).
Ferris, David, "How Wireless Charging Will Make Life Simpler (and Greener)", Forbes (See forbes.com/sites/davidferris/2012/07/24/how-wireless-charging-will-make-life-simpler-and-greener/print/) (dated Jul. 24, 2012).
Fildes, J., "Physics Promises Wireless Power", (Science and Technology Reporter), BBC News, (Nov. 15, 2006) 3 pages.
Fildes, J., "The technology with impact 2007", BBC News, (Dec. 27, 2007) 3 pages.

(56) References Cited

OTHER PUBLICATIONS

Fildes, J., "Wireless energy promise powers up", BBC News, http://news.bbc.co.uk/2/hi/technology/6725955.stm, (Jun. 7, 2007) 3 pages.
Finkenzeller, Klaus, "RFID Handbook—Fundamentals and Applications in Contactless Smart Cards", Nikkan Kohgyo-sya, Kanno Taihei, first version, pp. 32-37, 253 (Aug. 21, 2001).
Finkenzeller, Klaus, "RFID Handbook (2nd Edition)", The Nikkan Kogyo Shimbun, Ltd., pp. 19, 20, 38, 39, 43, 44, 62, 63, 67, 68, 87, 88, 291, 292 (Published on May 31, 2004).
Freedman, D.H., "Power on a Chip", MIT Technology Review, (Nov. 2004).
Gary Peterson, "MIT WiTricity Not So Original After All", *Feed Line No. 9*, (See http://www.tfcbooks.com/articles/witricity.htm) printed Nov. 12, 2009.
Geyi, Wen, "A Method for the Evaluation of Small Antenna Q", IEEE Transactions on Antennas and Propagation, vol. 51(8):2124-2129 (Aug. 2003).
Hadley, F., "Goodbye Wires—MIT Team Experimentally Demonstrates Wireless Power Transfer, Potentially Useful for Power Laptops, Cell-Phones Without Cords", Massachusetts Institute of Technology, Institute for Soldier D Nanotechnologies, http://web.mit.edu/newsoffice/2007/wireless-0607.html, (Jun. 7, 2007) 3 pages.
Haus, H.A., "Waves and Fields in Optoelectronics," Chapter 7 "Coupling of Modes—Reasonators and Couplers" (Prentice-Hall, New Jersey, 1984).
Heikkinen et al., "Performance and Efficiency of Planar Rectennas for Short-Range Wireless Power Transfer at 2.45 GHz", Microwave and Optical Technology Letters, vol. 31(2):86-91, (Oct. 20, 2001).
Highfield, R., "Wireless revolution could spell end of plugs-",(Science Editor), Telegraph.co.uk, http://www.telegraph.co.uk/news/main.jhtml?xml=/news/2007/06/07/nwirelessl 07.xml, (Jun. 7, 2007) 3 pages.
Hirai et al., "Integral Motor with Driver and Wireless Transmission of Power and Information for Autonomous Subspindle Drive", IEEE, vol. 15(1):13-20, (Jan. 2000).
Hirai et al., "Practical Study on Wireless Transmission of Power and Information for Autonomous Decentralized Manufacturing System", IEEE, vol. 46(2):349-359, Apr. 1999.
Hirai et al., "Study on Intelligent Battery Charging Using Inductive Transmission of Power and Information", IEEE, vol. 15(2):335-345, (Mar. 2000).
Hirai et al., "Wireless Transmission of Power and Information and Information for Cableless Linear Motor Drive", IEEE, vol. 15(1):21-27, (Jan. 2000).
Hirayama, M., "Splashpower—World Leaders in Wireless Power", PowerPoint presentation, Splashpower Japan, (Sep. 3, 2007) 30 pages.
Ho, S. L. et al., "A Comparative Study Between Novel Witricity and Traditional Inductive Magnetic Coupling in Wireless Charging", IEEE Transactions on Magnetics, vol. 47(5):1522-1525 (May 2011).
Infotech Online, "Recharging gadgets without cables", infotech.indiatimes.com, (Nov. 17, 2006) 1 page.
Jackson, J. D., "Classical Electrodynamics", 3rd Edition, Wiley, New York, 1999, pp. 201-203.
Jackson, J.D., "Classical Electrodynamics," 3rd Edition, Sections 1.11, 5.5, 5.17, 6.9, 8.1, 8.8, 9.2, 9.3 (Wiley, New York, 1999).
Jacob, M. V. et al., "Lithium Tantalate—A High Permittivity Dielectric Material for Microwave Communication Systems", *Proceedings of IEEE Tencon—Poster Papers*, pp. 1362-1366, 2003.
Karalis, Aristeidis, "Electricity Unplugged", Feature: Wireless Energy Physics World, physicsworld.com, pp. 23-25 (Feb. 2009).
Kawamura et al., "Wireless Transmission of Power and Information Through One High-Frequency Resonant AC Link Inverter for Robot Manipulator Applications", IEEE, vol. 32(3):503-508, (May/Jun. 1996).
Kurs, A. et al., "Wireless Power Transfer via Strongly Coupled Magnetic Resonances", *Science* vol. 317, pp. 83-86 (Jul. 6, 2007)

Kurs, A. et al., "Simultaneous mid-range power transfer to multiple devices", *Applied Physics Letters*, vol. 96, No. 044102 (2010).
Kurs, A. et al.,"Optimized design of a low-resistance electrical conductor for the multimegahertz range", *Applied Physics Letters*, vol. 98:172504-172504-3 (Apr. 2011).
Lamb, Gregory M. ,"Look Ma—no wires!—Electricity broadcast through the air may someday run your home",The Christian Science Monitor,http://www.csmonitor.com/2006/1116/p14s01-stct.html,Nov. 15, 2006,2 pages.
Lee, "Antenna Circuit Design for RFID Applications," Microchip Technology Inc., AN710, 50 pages (2003).
Lee, "RFID Coil Design," Microchip Technology Inc., AN678, 21 pages (1998).
Liang et al., "Silicon waveguide two-photon absorption detector at 1.5 μm wavelength for autocorrelation measurements," Applied Physics Letters, 81(7):1323-1325 (Aug. 12, 2002).
Markoff, J. ,"Intel Moves to Free Gadgets of Their Recharging Cords", The New York Times—nytimes.com, Aug. 21, 2008, 2 pages.
Mediano, A. et al. "Design of class E amplifier with nonlinear and linear shunt capacitances for any duty cycle", IEEE Trans. Microwave Theor. Tech., vol. 55, No. 3, pp. 484-492, (2007).
Microchip Technology Inc., "microID 13.56 MHz Design Guide—MCRF355/360 Reader Reference Design,"24 pages (2001).
Minkel, J R. ,"Wireless Energy Lights Bulb from Seven Feet Away—Physicists vow to cut the cord between your laptop battery and the wall socket—with just a simple loop of wire",Scientific American,http://www.scientificamerican.com/article.cfm?id=wireless-energy-lights-bulb-from-seven-feet-away,Jun. 7, 2007,1 page.
Minkel, J R. ,"Wireless Energy Transfer May Power Devices at a Distance",Scientific American,Nov. 14, 2006,1 page.
Morgan, J., "Lab report: Pull the plug for a positive charge", The Herald, Web Issue 2680, (Nov. 16, 2006) 3 pages.
Moskvitch, Katia, "Wireless charging—the future for electric cars?", BBC News Technology (See www.bbc.co.uk/news/technology-14183409) (dated Jul. 21, 2011).
O'Brien et al., "Analysis of Wireless Power Supplies for Industrial Automation Systems", IEEE, pp. 367-372 (Nov. 2-6, 2003).
O'Brien et al., "Design of Large Air-Gap Transformers for Wireless Power Supplies", IEEE, pp. 1557-1562 (Jun. 15-19, 2003).
Pendry, J. B., "A Chiral Route to Negative Refraction", Science, vol. 306:1353-1355 (2004).
Physics Today, "Unwired energy questions asked answered", Sep. 2007, pp. 16-17.
Powercast LLC. "White Paper" Powercast simply wire free, 2003.
PR News Wire, "The Big Story for CES 2007: The public debut of eCoupled Intelligent Wireless Power", Press Release, Fulton Innovation LLC, Las Vegas, NV, (Dec. 27, 2006) 3 pages.
Press Release, "The world's first sheet-type wireless power transmission system: Will a socket be replaced by e-wall?",Public Relations Office, School of Engineering, University of Tokyo, Japan,Dec. 12, 2006,4 pages.
Presstv, "Wireless power transfer possible", http://edition.presstv.ir/detail/12754.html, Jun. 11, 2007, 1 page.
Reidy, C. (Globe Staff), "MIT discovery could unplug your iPod forever", Boston.com, http://www.boston.com/ business/ticker/2007/06/mit_discovery_c.html, (Jun. 7, 2007) 3 pages.
Risen, C., "Wireless Energy", The New York Times, (Dec. 9, 2007) 1 page.
Sakamoto et al., "A Novel Circuit for Non-Contact Charging Through Electro-Magnetic Coupling", IEEE, pp. 168-174 (1992).
Scheible, G. et al., "Novel Wireless Power Supply System for Wireless Communication Devices in Industrial Automation Systems", IEEE, pp. 1358-1363, (Nov. 5-8, 2002).
Schneider, D. "A Critical Look at Wireless Power", *IEEE Spectrum*, pp. 35-39 (May 2010).
Schneider, David, "Electrons Unplugged. Wireless power at a distance is still far away", *IEEE Spectrum*, pp. 35-39 (May 2010).
Schuder, J. C. et al., "An Inductively Coupled RF System for the Transmission of 1 kW of Power Through the Skin", *IEEE Transactions on Bio-Medical Engineering*, vol. BME-18, No. 4, pp. 265-273 (Jul. 1971).

(56) References Cited

OTHER PUBLICATIONS

Schuder, J. C., "Powering an Artificial Heart: Birth of the Inductively Coupled-Radio Frequency System in 1960", *Artificial Organs*, vol. 26:909-915 (2002).

Schuder, J.C. et al., "Energy Transport Into the Closed Chest From a Set of Very-Large Mutually Orthogonal Coils", Communication Electronics, vol. 64:527-534 (Jan. 1963).

Schutz, J. et al., "Load Adaptive Medium Frequency Resonant Power Supply", IEEE, pp. 282-287 (Nov. 2002).

Sekitani et al. "A large-area wireless power-transmission sheet using printed organic transistors and plastic MEMS switches" www.nature.com/naturematerials. Published online Apr. 29, 2007.

Sekitani et al., "A large-area flexible wireless power transmission sheet using printed plastic MEMS switches and organic field-effect transistors", IEDM '06, International Electron Devices Meeting, (Dec. 11-13, 2006) 4 pages.

Sekiya, H. et al., "FM/PWM control scheme in class DE inverter", IEEE Trans. Circuits Syst. I, vol. 51(7) (Jul. 2004).

Senge, M., "MIT's wireless electricity for mobile phones", Vanguard, http://www.vanguardngr.com/articles/2002/features/gsm/gsm211062007.htm, (Jun. 11, 2007) 1 page.

Sensiper, S., "Electromagnetic wave propogation on helical conductors", Technical Report No. 194 (based on PhD Thesis), Massachusetts Institute of Technology, (May 16, 1951) 126 pages.

Soljacic, M. , "Wireless Non-Radiative Energy Transfer—PowerPoint presentation". Massachusetts Institute of Technology, (Oct. 6, 2005).

Soljacic, M. et al., "Wireless Energy Transfer Can Potentially Recharge Laptops Cell Phones Without Cords", (Nov. 14, 2006) 3 pages.

Soljacic, M. et al., "Photonic-crystal slow-light enhancement of nonlinear phase sensitivity", *J. Opt. Soc. Am B*, vol. 19, No. 9, pp. 2052-2059 (Sep. 2002).

Soljacic, M., "Wireless nonradiative energy transfer", *Visions of Discovery New Light on Physics, Cosmology, and Consciousness*, Cambridge University Press, New York, NY pp. 530-542 (2011).

Someya, Takao. "The world's first sheet-type wireless power transmission system". University of Tokyo, (Dec. 12, 2006).

Staelin, David H. et al., Electromagnetic Waves, Chapters 2, 3, 4, and 8, pp. 46-176 and 336-405 (Prentice Hall Upper Saddle River, New Jersey 1998).

Stark III, Joseph C., "Wireless Power Transmission Utilizing a Phased Array of Tesla Coils", Master Thesis, Massachusetts Institute of Technology (2004).

Stewart, W., "The Power to Set you Free", Science, vol. 317:55-56 (Jul. 6, 2007).

Tang, S.C. et al., "Evaluation of the Shielding Effects on Printed-Circuit-Board Transformers Using Ferrite Plates and Copper Sheets", *IEEE Transactions on Power Electronics*, vol. 17:1080-1088 (Nov. 2002).

Tesla, Nikola, "High Frequency Oscillators for Electro-Therapeutic and Other Purposes", *Proceedings of the IEEE*, vol. 87:1282-1292 (Jul. 1999).

Tesla, Nikola, "High Frequency Oscillators for Electro-Therapeutic and Other Purposes", *The Electrical Engineer*, vol. XXVI, No. 50 (Nov. 17, 1898).

Texas Instruments, "HF Antenna Design Notes—Technical Application Report," Literature No. 11-08-26-003, 47 pages (Sep. 2003).

Thomsen et al., "Ultrahigh speed all-optical demultiplexing based on two-photon absorption in a laser diode," Electronics Letters, 34(19):1871-1872 (Sep. 17, 1998).

UPM Rafsec, "Tutorial overview of inductively coupled RFID Systems," 7 pages (May 2003).

Valtchev et al. "Efficient Resonant Inductive Coupling Energy Transfer Using New Magnetic and Design Criteria". IEEE, pp. 1293-1298, 2005.

Vandevoorde et al., "Wireless energy transfer for stand-alone systems: a comparison between low and high power applicability", Sensors and Actuators, vol. 92:305-311 (2001).

Vilkomerson, David et al., "Implantable Doppler System for Self-Monitoring Vascular Grafts", *IEEE Ultrasonics Symposium*, pp. 461-465 (2004).

Villeneuve, Pierre R. et al., "Microcavities in photonic crystals: Mode symmetry, tunability, and coupling efficiency", *Physical Review B*, vol. 54:7837-7842 (Sep. 15, 1996).

Yariv, Amnon et al., "Coupled-resonator optical waveguide: a proposal and analysis", *Optics Letters*, vol. 24(11):711-713 (Jun. 1, 1999).

Yates, David C. et al., "Optimal Transmission Frequency for Ultralow-Power Short-Range Radio Links", IEEE Transactions on Circuits and Systems—1, Regular Papers, vol. 51:1405-1413 (Jul. 2004).

Yoshihiro Konishi, *Microwave Electronic Circuit Technology*, Chapter 4, pp. 145-197 (Marcel Dekker, Inc., New York, NY 1998).

Ziaie, Babak et al., "A Low-Power Miniature Transmitter Using a Low-Loss Silicon Platform for Biotelemetry", *Proceedings—19th International Conference IEEE/EMBS*, pp. 2221-2224, (Oct. 30-Nov. 2, 1997) 4 pages.

Zierhofer, Clemens M. et al., "High-Efficiency Coupling-Insensitive Transcutaneous Power and Data Transmission via an Inductive Link", *IEEE Transactions on Biomedical Engineering*, vol. 37, No. 7, pp. 716-722 (Jul. 1990).

\* cited by examiner

VOLTAGE SOURCE ISOLATION IN WIRELESS POWER TRANSFER SYSTEMS

CROSS-REFERENCE TO RELATED APPLICATIONS

This application claims priority to U.S. Provisional Patent Application No. 62/258,144, filed on Nov. 20, 2015, the entire contents of which are incorporated herein by reference.

TECHNICAL FIELD

This disclosure relates to wireless power transfer systems, and in particular, to isolating voltage sources from reference ground in such systems.

BACKGROUND

Energy can be transferred from a power source to a receiving device using a variety of known techniques such as radiative (far-field) techniques. For example, radiative techniques using low-directionality antennas can transfer a small portion of the supplied radiated power, namely, that portion in the direction of, and overlapping with, the receiving device used for pick up. In such methods, much—even most—of the energy is radiated away in directions other than the direction of the receiving device, and typically the transferred energy is insufficient to power or charge the receiving device. In another example of radiative techniques, directional antennas are used to confine and preferentially direct the radiated energy towards the receiving device. In this case, an uninterruptible line-of-sight and potentially complicated tracking and steering mechanisms are used.

Another approach to energy transfer is to use non-radiative (near-field) techniques. For example, techniques known as traditional induction schemes do not (intentionally) radiate power, but use an oscillating current passing through a primary coil, to generate an oscillating magnetic near-field that induces currents in a nearby receiving or secondary coil. Traditional induction schemes can transfer modest to large amounts of power over very short distances. In these schemes, the offset tolerances between the power source and the receiving device are very small. Electric transformers and proximity chargers, for example, typically use traditional induction schemes.

Wireless power transfer systems can be used to transfer significant quantities of power between a source resonator and a receiving resonator. To generate a large amplitude magnetic field using a magnetic source resonator, one or more source resonator coils are typically driven with a large amplitude AC voltage that is referenced to a common ground in the source.

SUMMARY

With components referenced in a common ground in a wireless power transmitter, the components in the source each should be capable of withstanding the large AC voltage that is applied to the resonator coil(s). For example, switches that are used in capacitor banks as part of impedance matching networks, components that are used for communication, and other circuit elements that are used to generate low power driving voltages, to detect low power signals, and/or to switch or adjust other elements, should all be capable of withstanding the large AC driving voltages. Components that can withstand such voltages are expensive and can therefore significantly increase the cost of wireless power transfer systems.

An alternative to common ground-referenced components would be to implement floating sources, switches, and other elements that are not referenced to the common wireless source ground. However, transformers that are typically used to implement floating elements are themselves expensive and bulky, and therefore also increase the cost and size of wireless power transfer systems.

Disclosed herein are systems and methods for wireless power transfer that implement floating components (e.g., voltage sources, switches, detectors, communication transmitters and receivers) by taking advantage of the large AC voltages that are used to drive source resonator coils. The systems include one or more auxiliary coils that transmit and/or receive small quantities of power, which can then be conditioned and used for a variety of applications. In effect, the auxiliary coils can be used to construct one or more floating "batteries" within a wireless power source. The floating batteries are then available for a wide variety of uses within the source.

In general, in a first aspect, the disclosure features wireless power transmitters that include a power source, a first coil connected to the power source, a second coil connected in series to the first coil, and a third coil positioned in proximity to the second coil, where during operation of the wireless power transmitter: the power source applies a driving voltage to the first and second coils; the first coil generates a first magnetic field that transfers power to a receiver resonator; the second coil generates a second magnetic field that induces a voltage across the third coil; and the induced voltage across the third coil is applied to a component of the wireless power transmitter.

Embodiments of the transmitters can include any one or more of the following features.

Each of the first, second, and third coils can include one or more loops of conductive material. The sources can include a housing that encloses the power source and the first, second, and third coils.

The component can include at least one of a resistive element, a capacitive element, and an inductive element of the wireless power transmitters. The component can include a switch of the wireless power transmitters. The component can include a component of an impedance matching network of the wireless power transmitters, e.g., an adjustable capacitor of the impedance matching network. The component can include a transceiver or transmitter configured to generate an information carrying signal.

The component can include a fourth coil configured to generate an information carrying magnetic field that, during operation, is received by a fifth coil connected to the receiver resonator. The sources can include a modulator configured to modulate the induced voltage to generate the information carrying magnetic field. The induced voltage can correspond to an oscillating voltage signal, and the modulator can be configured to modulate at least one of an amplitude and a frequency of the oscillating voltage signal to generate the information carrying magnetic field.

The sources can include a conditioning circuit connected to the third coil, where during operation, the conditioning circuit can be configured to at least one of rectify the induced voltage, adjust an amplitude of the induced voltage, and adjust a frequency of the induced voltage.

A magnitude of the induced voltage can be 1% or less (e.g., 0.01% or less) of a magnitude of a voltage induced in the receiver resonator. The induced voltage may not be referenced to a ground voltage of the wireless power transmitter.

The transmitters can include a fourth coil connected in series to the first and second coils, and a fifth coil positioned in proximity to the fourth coil, where during operation of the wireless power transmitters: the power source applies the driving voltage to the first, second, and fourth coils; the fourth coil generates a third magnetic field that induces a voltage across the fifth coil; and the induced voltage across the fifth coil is applied to a second component of the wireless power transmitters. The second component can include at least one of a resistive element, a capacitive element, an inductive element, a switch, and a component of an impedance matching network. The second component can include a transceiver configured to generate an information carrying signal. The second component can include a sixth coil configured to generate an information carrying magnetic field that, during operation, is received by a seventh coil connected to the receiver resonator.

Embodiments of the transmitters can also include any of the other features disclosed herein, including combinations of features disclosed in connection with different embodiments, except as expressly stated otherwise.

In another aspect, the disclosure features wireless power transmitters that include a power source, a first coil connected to the power source, and a second coil positioned in proximity to the first coil, where during operation of the wireless power transmitters: the power source applies a driving voltage to the first coil; the first coil generates a magnetic field that transfers power to a receiver resonator; the magnetic field induces a voltage across the second coil; and the induced voltage across the second coil is applied to a component of the wireless power transmitters.

Embodiments of the transmitters can include any one or more of the following features.

Each of the first and second coils can include one or more loops of conductive material. The transmitters can include a housing that encloses the power source and the first and second coils.

The component can include at least one of a resistive element, a capacitive element, and an inductive element of the wireless power transmitters. The component can include a switch of the wireless power transmitters. The component can include a component of an impedance matching network of the wireless power transmitters. The component can include an adjustable capacitor of the impedance matching network. The component can include a transceiver or transmitter configured to generate an information carrying signal.

The component can include a third coil configured to generate an information carrying magnetic field that, during operation, is received by a fourth coil connected to the receiver resonator. The sources can include a modulator configured to modulate the induced voltage to generate the information carrying magnetic field. The induced voltage can correspond to an oscillating voltage signal, and the modulator can be configured to modulate at least one of an amplitude and a frequency of the oscillating voltage signal to generate the information carrying magnetic field.

The sources can include a conditioning circuit connected to the second coil, where during operation, the conditioning circuit is configured to at least one of rectify the induced voltage, adjust an amplitude of the induced voltage, and adjust a frequency of the induced voltage.

A magnitude of the induced voltage can be 1% or less (e.g., 0.01% or less) of a magnitude of a voltage induced in the receiver resonator. The induced voltage may not be referenced to a ground voltage of the wireless power transmitters.

The sources can include a third coil positioned in proximity to the first coil, where during operation of the wireless power transmitters, the magnetic field induces a voltage across the third coil, and the induced voltage across the third coil is applied to a second component of the wireless power transmitters. The second component can include at least one of a resistive element, a capacitive element, an inductive element, a switch, and a component of an impedance matching network. The second component can include a transceiver or transmitter configured to generate an information carrying signal. The second component can include a fourth coil configured to generate an information carrying magnetic field that, during operation, is received by a fifth coil connected to the receiver resonator.

Embodiments of the transmitters can also include any of the other features disclosed herein, including combinations of features disclosed in connection with different embodiments, except as expressly stated otherwise.

In a further aspect, the disclosure features wireless power systems that include a power source, a first coil connected to the power source, a second coil connected in series to the first coil, a third coil positioned in proximity to the second coil, a controller connected to the third coil and configured to selectively modulate coupling between the second and third coils, a power receiving device, a receiver resonator connected to the power receiving device, and a fourth coil connected to the power receiving device and positioned in proximity to the second coil, where during operation of the wireless power transfer systems: the power source applies a driving voltage to the first and second coils; the first coil generates a first magnetic field that transfers power to the receiver resonator; the second coil generates a second magnetic field that induces voltages across the third and fourth coils; and the controller modulates the coupling between the second and third coils to adjust a magnitude of the induced voltage across the fourth coil.

Embodiments of the systems can include any one or more of the features disclosed herein, including combinations of features disclosed in connection with different embodiments, except as expressly stated otherwise.

In another aspect, the disclosure features methods that include applying a driving voltage across first and second coils connected in series in a wireless power transmitter to generate a first magnetic field and a second magnetic field, where the first magnetic field transfers power wirelessly to a receiver resonator, and where the second magnetic field induces a voltage across a third coil positioned in proximity to the second coil in the wireless power transmitter, and applying the induced voltage to a component of the wireless power transmitter.

Embodiments of the methods can include any one or more of the features disclosed herein, including combinations of features disclosed in connection with different embodiments, except as expressly stated otherwise.

In a further aspect, the disclosure features methods that include applying a driving voltage across a source coil in a wireless power transmitter to generate a magnetic field to transfer power wirelessly to a receiver resonator, inducing a voltage in an auxiliary coil positioned in proximity to the source coil in the wireless power transmitter, and applying the induced voltage to a component of the wireless power transmitter.

Embodiments of the methods can include any one or more of the features disclosed herein, including combinations of features disclosed in connection with different embodiments, except as expressly stated otherwise.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

DESCRIPTION OF DRAWINGS

Like reference symbols in the various drawings indicate like elements.

DETAILED DESCRIPTION

Introduction

A wireless power transfer system can include a power transmitting apparatus which is configured to wirelessly transmit power to a power receiving apparatus. In some embodiments, the power transmitting apparatus can include a source coil which generates oscillating fields (e.g., electric fields, magnetic fields) due to currents oscillating within the source coil. The generated oscillating fields can couple to the power receiving apparatus and provide power to the power receiving apparatus through the coupling. To achieve coupling, the power receiving apparatus typically includes a receiver coil. The oscillating fields generated by the source coil can induce oscillating currents within the receiver coil. In some embodiments, either or both of the source and receiver coils can be resonant. In some other embodiments, either or both of the source and receiver coils can be non-resonant so that power transfer is achieved through non-resonant coupling.

In some embodiments, a wireless power transfer system can utilize a source resonator to wirelessly transmit power to a receiver resonator. For example, a power transmitting apparatus of the system can include the source resonator, which has a source coil, and a power receiving apparatus of the system can include the receiver resonator, which has a receiver coil. Power can be wirelessly transferred between the source resonator and the receiver resonator. In certain embodiments, the wireless power transfer can be extended by multiple source resonators and/or multiple device resonators and/or multiple intermediate (also referred as "repeater" or "repeating") resonators.

Figure 1:
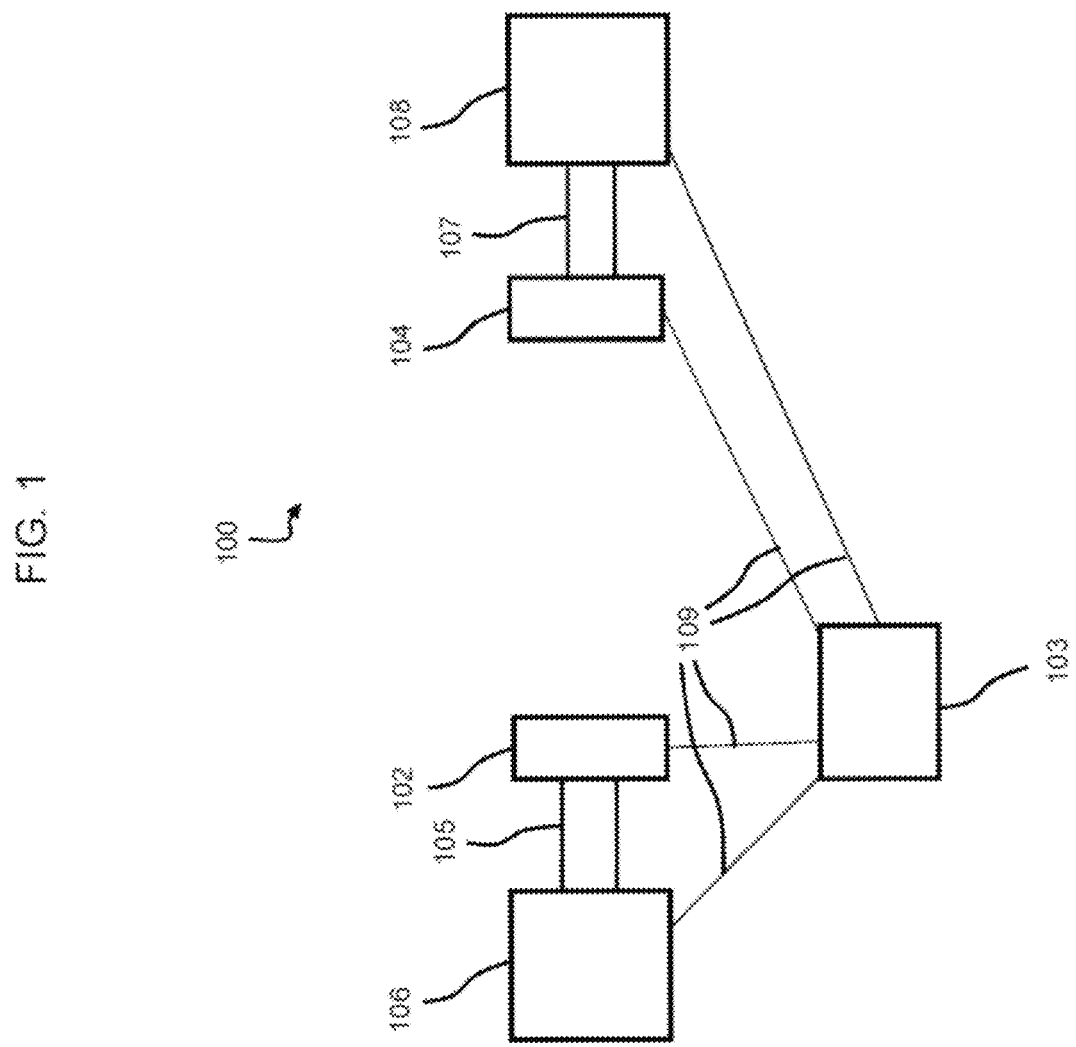
FIG. 1 is a schematic diagram of a wireless power system.

FIG. 1 is a schematic diagram of a wireless power transfer system 100. System 100 includes a power transmitting apparatus 102 and a power receiving apparatus 104. Power transmitting apparatus 102 is coupled to power source 106 through a coupling 105. In some embodiments, coupling 105 is a direct electrical connection. In certain embodiments, coupling 105 is a non-contact inductive coupling. In some embodiments, coupling 105 can include an impedance matching network (not shown in FIG. 1). Impedance matching networks and methods for impedance matching are disclosed, for example, in commonly owned U.S. patent application Ser. No. 13/283,822, published as US Patent Application Publication No. 2012/0242225, the entire contents of which are incorporated herein by reference.

In similar fashion, power receiving apparatus 104 is coupled to a device 108 through a coupling 107. Coupling 107 can be a direct electrical connection or a non-contact inductive coupling. In some embodiments, coupling 107 can include an impedance matching network, as described above.

In general, device 108 receives power from power receiving apparatus 104. Device 108 then uses the power to do useful work. In some embodiments, for example, device 108 is a battery charger that charges depleted batteries (e.g., car batteries). In certain embodiments, device 108 is a lighting device and uses the power to illuminate one or more light sources. In some embodiments, device 108 is an electronic device such as a communication device (e.g., a mobile telephone) or a display. In some embodiments, device 108 is a medical device which can be implanted in a patient.

During operation, power transmitting apparatus 102 is configured to wirelessly transmit power to power receiving apparatus 104. In some embodiments, power transmitting apparatus 102 can include a source coil, which can generate oscillating fields (e.g., electric, magnetic fields) when electrical currents oscillate within the source resonator. The generated oscillating fields can couple to power receiving apparatus 104 and provide power to the power receiving apparatus through the coupling. To achieve coupling between power transmitting apparatus 102 and power receiving apparatus 104, the power receiving apparatus can include a receiver resonator. The oscillating fields can induce oscillating currents within the receiver resonator.

In certain embodiments, the system 100 can include a power repeating apparatus (not shown in FIG. 1). The power repeating apparatus can be configured to wirelessly receive power from the power transmitting apparatus 102 and wirelessly transmit the power to the power receiving apparatus 104. The power repeating apparatus can include similar elements described in relation to the power transmitting apparatus 102 and the power receiving apparatus 104 above.

System 100 can include an electronic controller 103 configured to control the power transfer in the system 100, for example, by directing electrical currents through coils of the system 100. In some embodiments, the electronic controller 103 can tune resonant frequencies of resonators included in the system 100, through coupling 109. In some embodiments, the electronic controller 103 can tune impedance matching elements in either impedance matching network. The electronic controller 103 can be coupled to one or more elements of the system 100 in various configurations. For example, the electronic controller 103 can be only coupled to power source 106. The electronic controller 103 can be coupled to power source 106 and power transmitting apparatus 102. The electronic controller 103 can be only coupled to power transmitting apparatus 102. In some embodiments, coupling 109 is a direct connection. In certain embodiments, coupling 109 is a wireless communication (e.g., radio-frequency, Bluetooth communication). The coupling 109 between the electronic controller 103 and the various components of system 100 can depend, respectively, on the components. For example, the electronic controller 103 can be directly connected to power source 106 while wirelessly communicating with power receiving apparatus 104.

In some embodiments, the electronic controller 103 can configure the power source 106 to provide power to the power transmitting apparatus 102. For example, the electronic controller 103 can increase the power output of the power source 106 by sending a higher drive current to a coil in the power transmitting apparatus 102. The power output can be at an operating frequency, which is used to generate oscillating fields by the power transmitting apparatus 102.

In certain embodiments, the electronic controller 103 can tune a resonant frequency of a resonator in the power transmitting apparatus 102 and/or a resonant frequency of a resonator in the power receiving apparatus 104. By tuning resonant frequencies of resonators relative to the operating frequency of the power output of the power source 106, the efficiency of power transfer from the power source 106 to the device 108 can be controlled. For example, the electronic controller 103 can tune the resonant frequencies to be substantially the same (e.g., within 0.5%, within 1%, within 2%) to the operating frequency to increase the efficiency of power transfer. The electronic controller 103 can tune the resonant frequencies by adjusting capacitance values of respective resonators. To achieve this, for example, the electronic controller 103 can adjust a capacitance of a capacitor connected to a coil in a resonator. The adjustment can be based on the electronic controller 103's measurement of the resonant frequency or based on wireless communication signal from the apparatuses 102 and 104. In certain embodiments, the electronic controller 103 can tune the operating frequency to be substantially the same (e.g., within 0.5%, within 1%, within 2%) to the resonant frequencies of the resonators. In some embodiments, the electronic controller 103 can tune the operating frequency.

In some embodiments, the electronic controller 103 can control an impedance matching network in the system 100 to optimize or de-tune impedance matching conditions in the system 100, and thereby control the efficiency of power transfer. For example, the electronic controller 103 can tune capacitance of capacitors or networks of capacitors included in the impedance matching network connected between power transmitting apparatus 102 and power source 106.

The optimum impedance conditions can be calculated internally by the electronic controller 103 or can be received from an external device.

Figure 2:
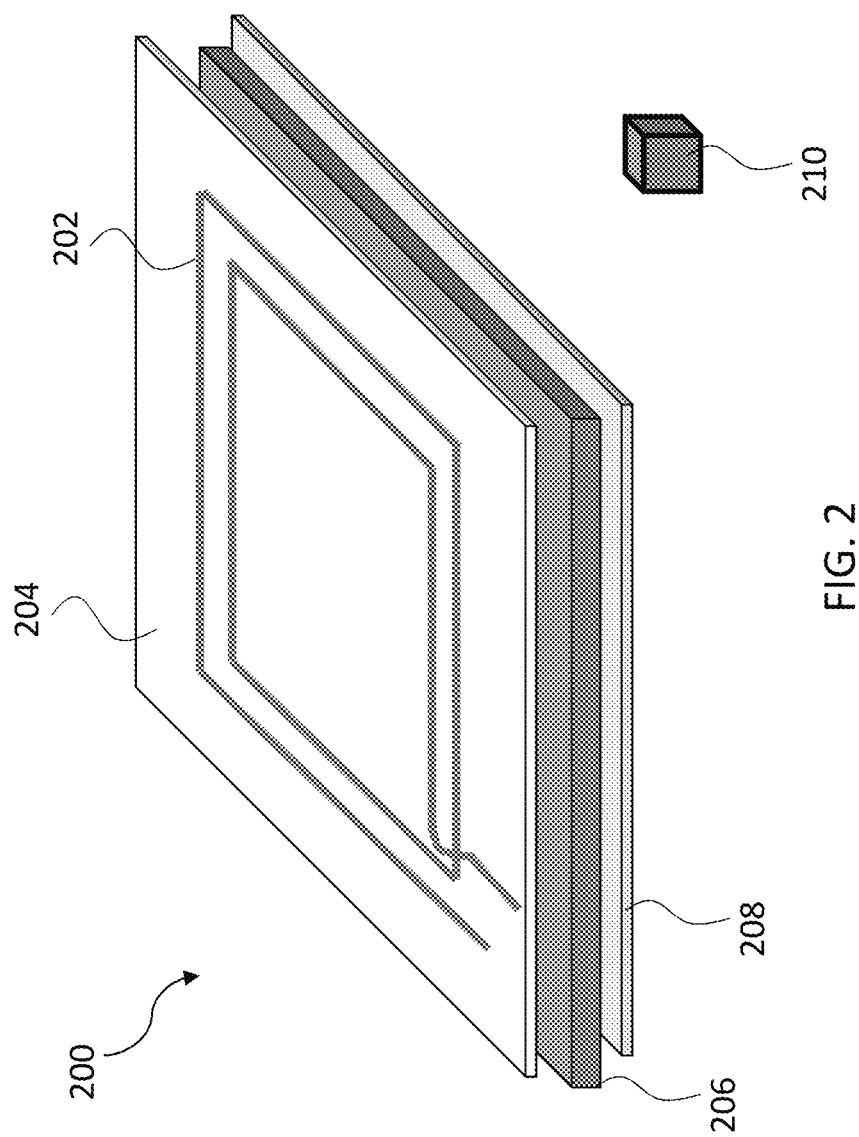
FIG. 2 is a perspective view of a wireless power transmitting apparatus.

FIG. 2 is a schematic diagram of a power transmitting apparatus 200 that includes a resonator coil 202 having a plurality of loops. The resonator coil 202 can be printed on substrate 204 in the form of, for example, a printed circuit board. In some embodiments, a layer of magnetic material 206 can guide the magnetic field from one side of the resonator coil 210. In certain embodiments, the power transmitting apparatus 200 can include a shield 208 (e.g., a sheet of conductive material) positioned between coil 202 and a lossy object 210. Shield 208, which is typically formed of a conductive material (such as copper, aluminum, and/or other metallic materials), shields magnetic fields generated by coil 202 from lossy object 210 (e.g., lossy steel object). For example, the shield 208 can reduce aberrant coupling of magnetic fields to lossy object 210 by guiding magnetic field lines away from the lossy object 210.

Figure 3:
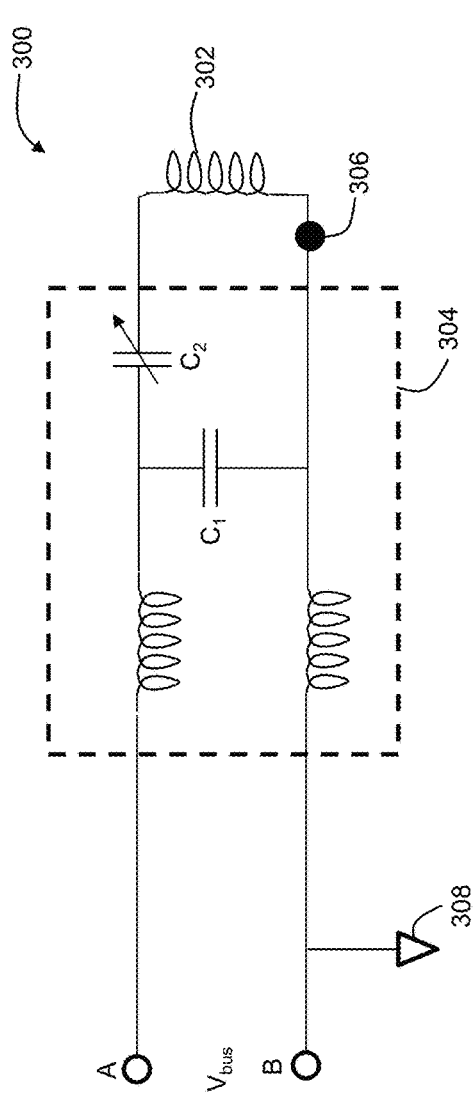
FIG. 3 is a schematic diagram of a wireless power source.

FIG. 3 is a schematic diagram of a portion of a wireless power transmitter 300. Source 300 includes a resonator coil 302 used to generate an oscillating magnetic field for wireless power transfer. Coil 302 is coupled through an impedance matching network (IMN) 304 to a power source represented by terminals A and B. Impedance matching network 304 includes a fixed capacitance $C_1$ and a variable capacitance $C_2$, although an impedance matching network 304 can be implemented in a wide variety of ways. Various aspects of impedance matching networks are disclosed, for example, in U.S. Patent Application Publication No. 2015/0270719, the entire contents of which are incorporated herein by reference.

The power source applies a driving voltage between terminals A and B to drive coil 302 to generate the magnetic field. The power source is referenced to common ground 308, as are the other components of source 300. During operation, the voltage at each of the terminals A and B can range from 0 (i.e., the ground voltage) to a maximum voltage $V_{max}$, which can be 1 V to 50 V or more.

A voltage difference $V_A - V_B$ is applied across coil 302 to drive the coil and generate the magnetic field used for wireless power transfer to a receiving coil. However, because $V_A$ and $V_B$ can each range in magnitude from $V_{max}$ to 0 (the common ground voltage), each of the other components in source 300—including the capacitors, inductors, switches, and other components of IMN 304—should be capable of withstanding any voltage up to $V_{max}$ to ensure that failure does not occur during operation of source 300. If source 300 is tapped at point 306, for example, to apply a voltage to a switch, a resistive element, a capacitive element, an inductive element, or any other circuit component, that component should also be capable of withstanding any voltage up to $V_{max}$ to ensure failure does not occur, since that component will also be referenced to ground 308.

Since $V_{max}$ in wireless power transfer systems can be high, implementing such systems with hundreds or thousands of elements, all of which are capable of withstanding high voltages, adds significant expense to the systems. Moreover, for certain components designed to operate only at low voltages, designing high voltage-capable counterparts may be quite difficult.

Decoupling certain components of source 300 from common ground 308 creates "floating" components, i.e., components that are not ground referenced. During operation, components that are not ground referenced need only be capable of withstanding the voltage difference that is applied across their terminals, not the difference between the voltage at one terminal and a ground reference, as discussed above. Such components are said to be "isolated" from other components in the system.

Figure 4:
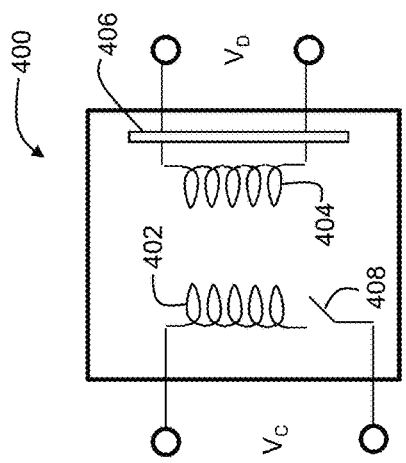
FIG. 4 is a schematic diagram of a flyback transformer.

In general electrical circuits, isolation can conventionally be performed using DC-DC flyback transformers. FIG. 4 is a schematic diagram of a flyback transformer 400 that includes a primary winding 402 and a secondary winding 404. During operation, a voltage $V_C$ is applied across primary winding 402, which is spaced from secondary winding 404. The current flowing in primary winding 402 generates a magnetic field which in turn induces a voltage $V_D$ across the terminals of secondary winding 404.

In general, voltage $V_D$ across the terminals of secondary winding 404 is only induced when the magnetic field generated by primary winding 402 is time-varying. However, $V_C$ is typically a DC voltage. Accordingly, to produce a time-varying magnetic field from primary winding 402 (which approximates the field that would be produced from an AC driving voltage), $V_C$ can be "chopped" using switch 408, which alternately opens and closes to replicate a time-varying driving voltage.

The voltage that is thus induced across secondary coil 404 is a time-varying voltage also. Typically, however, flyback transformers are used for DC-DC voltage conversion. Accordingly, the induced voltage can be conditioned by voltage conditioner 406 (which can be, for example, a rectifier) to produce a DC output voltage $V_D$, which differs from the input DC voltage $V_C$.

Figure 5:
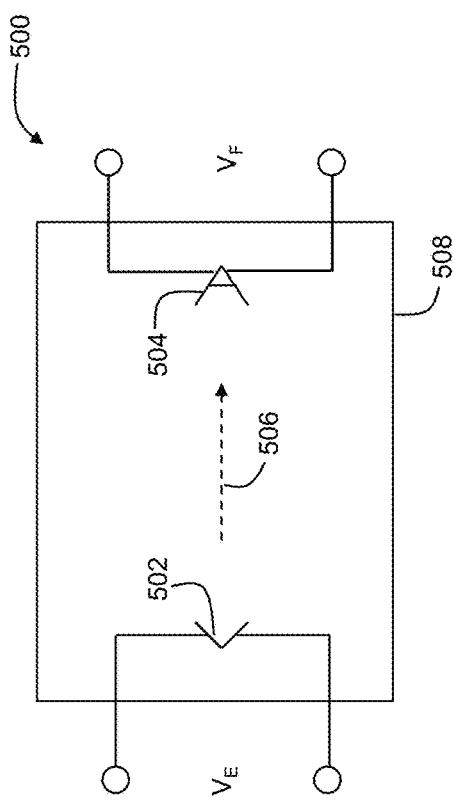
FIG. 5 is a schematic diagram of an opto-coupler.

Isolation can also be achieved using opto-couplers, particularly for low power signals such as those used for communication. FIG. 5 is a schematic diagram of an opto-coupler 500 that includes a radiation source 502 and a radiation receiver 504 enclosed in a housing 508. During operation, a voltage $V_E$ is applied across the terminals of source 502, causing source 502 to emit radiation 506. The emitted radiation is detected by receiver 504, which generates a voltage $V_F$ across its terminals. As the conversions from electrical energy to radiation and then from radiation back to electrical energy are lossy processes, $V_F$ is less than $V_E$. Moreover, conventional sources 502 are not capable of generating sufficient quantities of radiation 506 such that large quantities of power can be transferred between source 502 and receiver 504. As a result, opto-couplers are best suited for isolation in circumstances where only weak signals are involved, such as in communication.

Isolation with Auxiliary Coils

The benefits of achieving isolation of circuit elements are significant. For circuit elements that are isolated from large potentials relative to ground, the elements need only be capable of withstanding smaller voltages. As low-voltage circuit components are typically much cheaper than corresponding high-voltage components, portions of wireless power sources can be implemented at significant cost savings.

In addition, systems that implement isolation among components are typically safer, as portions of such systems are not exposed to high voltages. Isolation is important in medical applications, for example, where a wireless power source may be located in close proximity to a human or animal patient. Isolating certain components of the source ensures that the human or animal is not exposed to potentially lethal voltages that are generated within the source.

Further, isolation helps to eliminate electromagnetic interference (EMI) that can arise when energy couples back into the common ground, giving rise to ground loops. When this occurs, electrical noise from the ground-coupled energy can propagate into other components of the system that are also connected to the common ground, and can particularly disrupt low power signals such as those used for communication and low amplitude measurements.

But while these advantages of isolation in wireless power transfer systems are significant, the use of conventional isolation technologies in such systems is difficult, and obviates some of the advantages. Transformers that operate at high voltages are large and expensive, and inclusion of such devices in wireless power source can both increase the physical size of the source and increase the cost of the source. If multiple groups of isolated components are desired, multiple transformers may be required, further emphasizing these drawbacks. Opto-couplers are generally also expensive and only suitable for isolation of components that handle very low-power signals such as communication signals.

The systems and methods disclosed herein implement isolation in a different manner, using one or more auxiliary coils (i.e., coils that are different from one or more source resonator coils that are used to transfer power wirelessly to a receiver resonator by generating magnetic fields). In particular, the systems and methods exploit the AC driving voltage that is generated within a source resonator and used to drive one or more source resonator coils, using the driving voltage to generate auxiliary magnetic fields (or capturing a small portion of the magnetic field that is generated by the source resonator coil(s)) to transfer small quantities of power wirelessly to additional components within the source. As the additional components are not connected through conductors to the electronics that generate the AC driving voltage, the additional components are isolated from the source's common ground. The additional components therefore are effectively driven by floating batteries or power sources, and are not subject to, or expected to withstand, the large ground-referenced voltages that are generated in the source.

Figure 6:
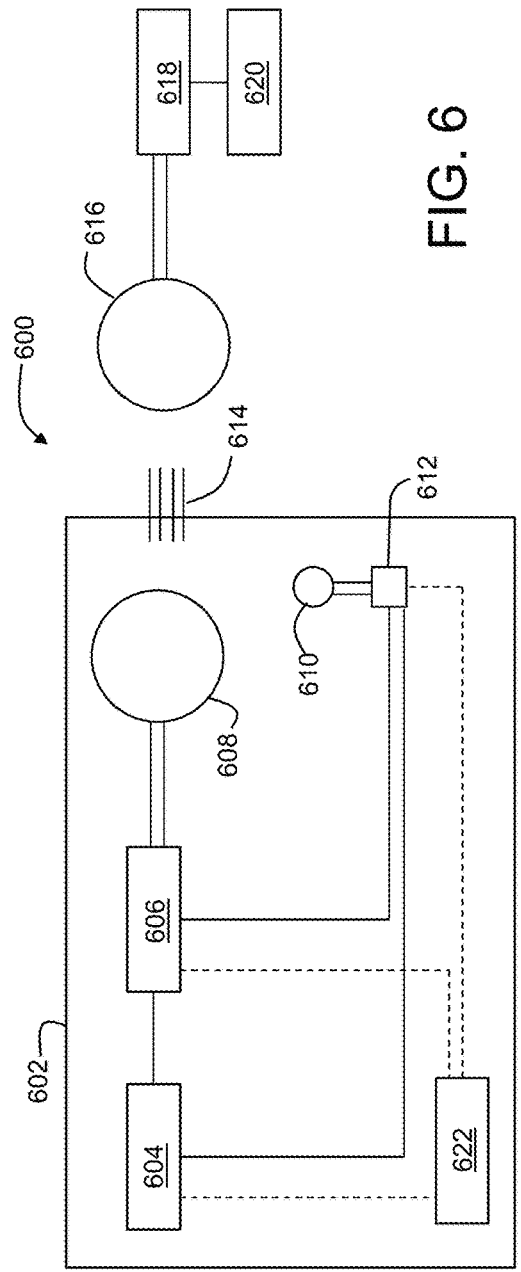
FIG. 6 is a schematic diagram of a wireless power transfer system that includes one or more auxiliary coils.

FIG. 6 is a schematic diagram showing one embodiment of a wireless power transfer system 600 that includes one or more auxiliary coils for ground-isolation of components. In FIG. 6, a housing 602 encloses the components of a source, which include a power source 604, switching and impedance matching circuitry 606, a source resonator coil 608, an auxiliary coil 610, and conditioning circuit 612. During operation of system 600, power source 604 generates an AC driving voltage that is conveyed to coil 608 through switching and impedance matching circuitry 606. Coil 608 generates a magnetic field (represented by field lines 614), a portion of which is captured by receiver resonator coil 616, inducing a current within the coil. Switching and impedance matching circuitry 618 (along with switching and impedance matching circuitry 606) is configured to ensure that power is transferred efficiently between source coil 608 and receiver coil 616. The current induced in receiver coil 616 is delivered to device 620, where it performs useful work.

During operation of system 600, auxiliary coil 610—which can be positioned outside of a principal region of power transfer between source and receiver coils 608 and 616—captures a small fraction of the magnetic field generated by source coil 608, inducing a small voltage across auxiliary coil 610. The induced voltage is optionally conditioned by conditioning circuit 612, before being used to drive one or more elements in switching and impedance matching circuitry 606 and/or power source 604. Conditioning can include, but is not limited to, rectification of the AC voltage induced in auxiliary coil 610 to generate a DC voltage, attenuation of the voltage induced in auxiliary coil 610, and changing the frequency of the voltage induced in auxiliary coil 610.

Typically, auxiliary coil 610 captures only a very small portion of the magnetic field that is generated by source coil 608, and therefore the voltage generated across the terminals of auxiliary coil 610 is small relative to the driving voltage applied to source coil 608. By capturing only a small fraction of the field that is generated, the perturbing effect of the auxiliary coil on the transfer of power between source coil 608 and receiver coil 616 is relatively insignificant. In some embodiments, for example, the voltage across auxiliary coil 610, $V_{aux}$ can be 1% or less of the driving voltage $V_{src}$ applied across source coil 608 (e.g., 0.5% or less, 0.1% or less, 0.05% or less, 0.01% or less, 0.001% or less, 0.0001% or less).

In FIG. 6, a single auxiliary coil is used in system 600 to function effectively as a floating voltage source. More generally, however, system 600 can include more than one auxiliary coil configured in the same manner, each of which functions as an independent, floating voltage source. In some embodiments, for example, system 600 can include 2 or more auxiliary coils (e.g., 3 or more auxiliary coils, 4 or more auxiliary coils, 5 or more auxiliary coils, 7 or more auxiliary coils, or even more).

Figure 13A:
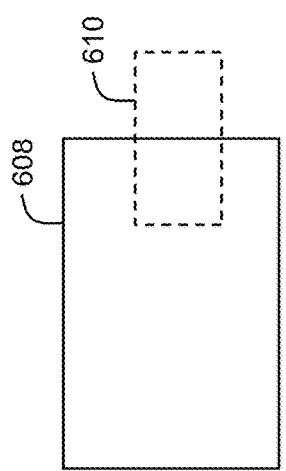
FIGS. 13A-13C are schematic diagrams showing a portion of a source resonator coil in proximity to a portion of an auxiliary coil.

In general, the auxiliary coil 610 can be positioned on or near the source resonator coil 608, and the spatial location and orientation of auxiliary coil 610 relative to source resonator coil 608 can be adjusted to control the amount of flux captured by auxiliary coil 610 from source coil 608, and the coupling between the coils. In some embodiments, for example, auxiliary coil 610 and source coil 608 overlap in the x-y (i.e., coil) plane, but are relatively displaced in a direction perpendicular to the plane. FIG. 13A is a schematic diagram showing an embodiment of a wireless power transfer system in which auxiliary coil 610 overlaps with, and is displaced vertically from, source resonator coil 608. To indicate that coil 610 is in a different plane from coil 608, coil 610 is shown in dashed lines.

Figure 13B:
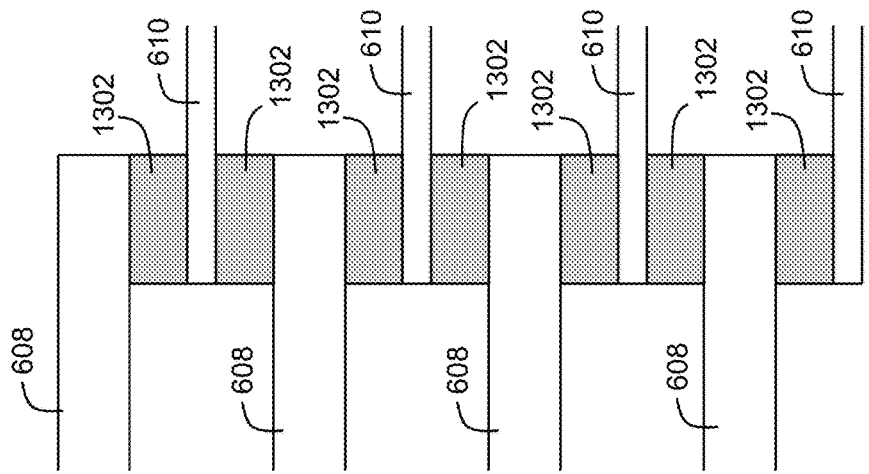

In certain embodiments, auxiliary coil 610 and source resonator coil 608 can be interleaved. FIG. 13B is a schematic diagram showing an embodiment of a wireless power transfer system in which individual loops of source coil 608 are interleaved with loops of auxiliary coil 610. Insulating material 1302 is positioned between adjacent interleaved loops.

Figure 13C:
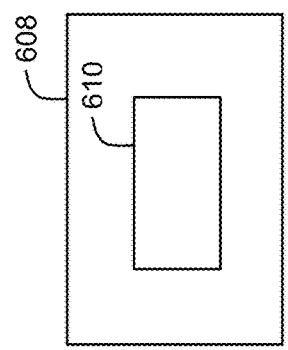

In some embodiments, auxiliary coil 610 can be positioned within source resonator coil 608. FIG. 13C is a schematic diagram of a wireless power transfer system in which auxiliary coil 610, which is coplanar with source resonator coil 608, is positioned within a central region of source coil 608, surrounded by the loops of source coil 608.

In general, the action of conditioning circuit 612, as well as power source 604 and switching and matching circuitry 606, is controlled by controller 622, which is connected to conditioning circuit 612, power source 604, and switching and matching circuitry 606 via one or more communication lines (shown as dashed lines in FIG. 6). In addition to regulating modulation (amplitude and/or frequency) and rectification by conditioning circuit 612, controller 622 also adjusts the driving voltage and frequency generated by power source 604, impedance adjustment by circuitry 606, and also regulates other functions such as communication between components of the source, and between the source and device 620.

In FIG. 6, auxiliary coil 610 is positioned inside housing 602. Housing 602 can be formed from or lined with a material (e.g., a conductive material) that effectively prevents stray fields other than those used for wireless power transfer from escaping. By positioning auxiliary coil 610 inside housing 602, the portion of the magnetic field that is captured by auxiliary coil 610 does not affect other field-sensitive devices or elements that may be positioned outside housing 602, which reduces electrical interference and noise that might otherwise occur during operation of the system. More generally, however, in certain embodiments, auxiliary coil 610 can be positioned either inside housing 602 or external to housing 602. By positioning auxiliary coil 610 external to housing 602, the auxiliary coil may be able to capture a larger fraction of the field generated by source coil 608. Such a configuration can be useful for certain applications, particularly where shielding and/or containment of the magnetic field is not as significant a concern.

Figure 7:
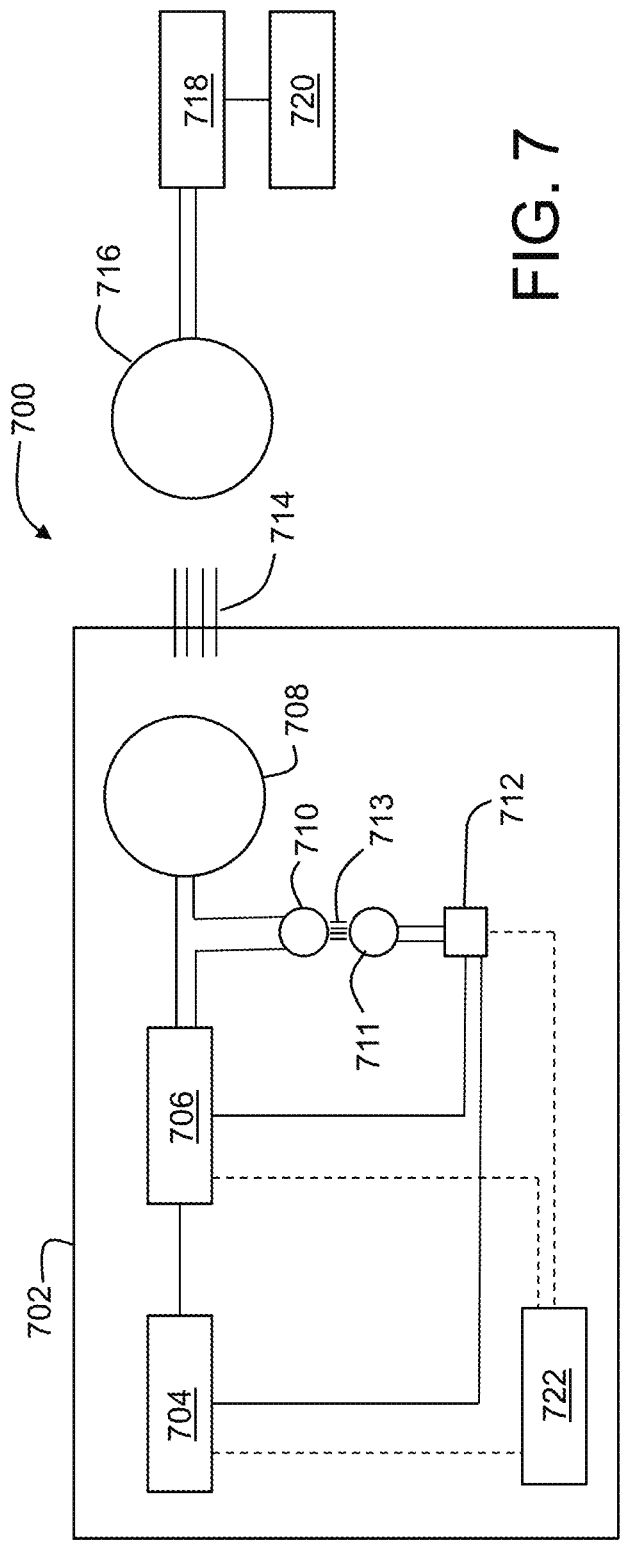
FIG. 7 is a schematic diagram of a wireless power transfer system that includes two auxiliary coils.

In certain embodiments, multiple auxiliary coils can be used to create an isolated, floating voltage source. FIG. 7 is a schematic diagram of a wireless power transfer system 700 that includes a power source 704, switching and matching circuitry 706, source resonator coil 708, and a controller 722 enclosed within a housing 702. During operation, source resonator coil 708 generates a magnetic field (represented by field lines 714) that is captured by receiver resonator coil 716, which is coupled to switching and matching circuitry 718. The current induced in receiver resonator coil 716 is coupled to load 720 and provides electrical power for the load. The foregoing components of system 700 function in a manner similar to their counterparts in system 600.

System 700 includes two auxiliary coils 710 and 711. Coil 710 is connected in series with source resonator coil 708, such that the driving voltage applied to source resonator coil 708 is also applied across auxiliary coil 710. Coil 711 is coupled to conditioning circuit 712. During operation of system 700, when the driving voltage is applied across source resonator coil 708 and auxiliary coil 710, auxiliary coil 710 generates a magnetic field (represented by field lines 713). Auxiliary coil 711 captures the field generated by coil 710, which induces a voltage across the terminals of coil 711. Conditioning circuit 712 is configured to perform functions similar to the functions of conditioning circuit 612, i.e., rectifying the induced voltage across coil 711 and/or modulating the amplitude and/or frequency of the induced voltage, for example. The conditioned voltage then functions as an auxiliary floating power source, which is coupled to one or more elements of power source 704 and/or switching and matching circuitry 706 within the wireless power source.

As shown in FIG. 7, auxiliary coils 710 and 711 can be fully enclosed within housing 702 to ensure that magnetic fields used to creating floating power sources do not perturb other components of the system (i.e., components that are not part of the wireless power source). More generally, auxiliary coils 710 and/or 711 can be positioned either interior to housing 702 or exterior to housing 702, depending upon the particular wireless power transfer application.

The use of two auxiliary coils—one of which is connected in series with source resonator coil 708—to realize a floating power source internal to the wireless power source that is isolated from the wireless power source's common ground reference has certain advantages relative to one-auxiliary-coil implementations, as shown in FIG. 6. By using a first auxiliary coil (i.e., coil 710) to generate a small amplitude magnetic field, and a second auxiliary coil (i.e., coil 711) to capture the small amplitude field, the auxiliary coil that receives the field does not have to be positioned anywhere near the magnetic field that is generated by source coil 708 for wireless power transfer. As such, the use of auxiliary coils does not perturb the spatial field distribution (represented by magnetic field lines 714) used for wireless power transfer, and the auxiliary coil that receives the magnetic field does not capture too large a fraction (or even any fraction) of the wireless power transfer field. Furthermore, the use of two auxiliary coils allows for greater flexibility in the layout and design of wireless power transfer systems; pairs of auxiliary coils can be positioned at nearly any desired location within the wireless power source to realize a floating auxiliary power source.

In general, auxiliary coil 710 can be positioned in series with source coil 708 on either side of source coil 708 (i.e., in terms of current flow, either upstream or downstream relative to source coil 708). Further, while a single pair of auxiliary coils are used to implement a single auxiliary floating power source in FIG. 7, more generally a wireless power source can include multiple pairs of auxiliary coils, each of which is used to implement an independent auxiliary floating power source.

Figure 8:
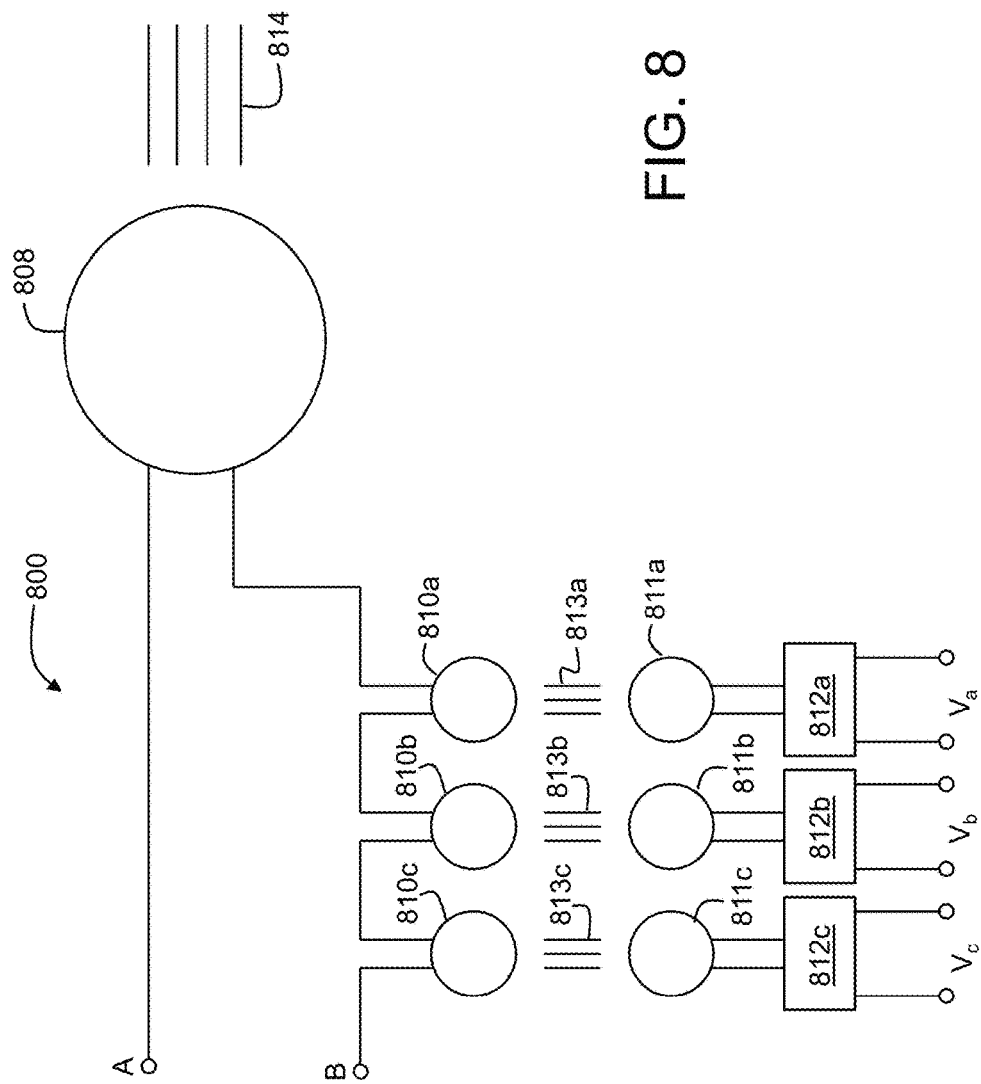
FIG. 8 is a schematic diagram of a wireless power transfer system that includes multiple floating auxiliary power sources.

FIG. 8 is a schematic diagram showing a portion of a wireless power system 800 that is similar to system 700 of FIG. 7, but includes multiple floating auxiliary power sources. More specifically, in system 800, a source resonator coil 808 is connected at points A and B to switching and matching circuitry and a power source (not shown in FIG. 8), and during operation, generates a magnetic field 814 for wireless power transfer to a receiving resonator. Connected in series with source coil 808 are three auxiliary coils 810a, 810b, and 810c, which generate magnetic fields 813a, 813b, and 813c, respectively, when the driving voltage is applied across terminals A and B. Fields 813a-c are captured by auxiliary coils 811a, 811b, and 811c, respectively, inducing voltages across each of coils 811a-c. The induced voltages are conditioned, respectively, by conditioning circuits 812a, 812b, and 812c. As a result, auxiliary coils 810a-c and 811a-c yield three floating, independent auxiliary voltage sources $V_a$, $V_b$, and $V_c$, each of which can be connected to one or more components within the wireless power source to drive the components and/or perform other useful work.

While system 800 includes three auxiliary floating power sources, in general any number of auxiliary power sources can be included in a wireless power source. For example, a wireless power source can include two or more auxiliary floating power sources (e.g., three or more sources, four or more sources, five or more sources, or even more sources). Each of the multiple sources can be implemented using a single auxiliary coil, as discussed above in connection with FIG. 6, or using two auxiliary coils, as discussed in connection with FIGS. 7 and 8. In some embodiments, these implementations can be mixed: one or more auxiliary floating power sources can be implemented using a single auxiliary coil, and one or more auxiliary floating power sources can be implemented using pairs of auxiliary coils. Typically, the area and strength of the magnetic field generated by source resonator 808 are considerations in determining the number of auxiliary power sources that are implemented.

Whether auxiliary floating power sources are implemented using a single auxiliary coil or a pair of auxiliary coils, the sizes of the coils (e.g., the number of turns, the diameter of the turns, the size and composition of the core material) determine the magnitudes of the voltages of each auxiliary source. In general, the sizes of the coils are chosen such that perturbations of the wireless power transfer process between the source coil and the receiver resonator are relatively insignificant, and so that the voltage of each floating source is nonetheless sufficient for its intended purpose. Where a wireless power source includes multiple auxiliary floating sources, the sources are independent and therefore can have the same or different output voltages. For example, in system 800, $V_a$, $V_b$, and $V_c$ can be the same, any two of these can be the same, or they can each be different voltages.

Applications

The floating (i.e., ground isolated) auxiliary sources disclosed herein can be used for a variety of applications in wireless power transfer systems. In general, each of the auxiliary sources is coupled to one or more low voltage components within the wireless power source and is used to drive the coupled components. Because the auxiliary sources are decoupled from the wireless power source's common ground, the components to which they are coupled are not subjected to the large, ground-referenced voltages that are generated by the wireless power source's electronics. To the contrary, the components to which the auxiliary sources are coupled are subjected only to the much lower floating voltages (i.e., $V_a$, $V_b$, and $V_c$ in system 800), and are therefore significantly cheaper to implement than their corresponding high voltage counterparts would be.

Figure 9:
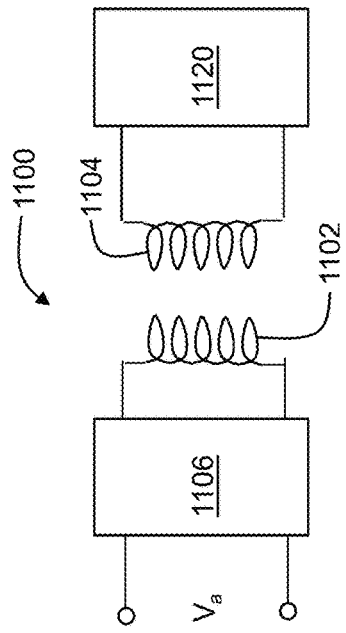
FIG. 9 is a schematic diagram of a portion of a wireless power transfer system that uses an auxiliary coil to adjust a variable capacitance.

Floating auxiliary power sources can generally be used for functions that fall within one of two categories in a wireless power source: power-related functions and communication-related functions. Power-related functions include driving adjustable components such as inductors, capacitors, resistors, switches, detectors, and other electronic devices. FIG. 9 illustrates an example of such an application. In FIG. 9, the output voltage $V_a$ from a floating auxiliary source (such as the corresponding source shown in FIG. 8) is connected across switch $S_1$, which is connected in series with capacitance $C_2$ of an adjustable capacitor. The adjustable capacitor also includes a fixed capacitance $C_1$. When voltage $V_a$ is applied across switch $S_1$, the switch closes, coupling $C_2$ into the circuit. When the voltage is not applied across $S_1$, $C_2$ is decoupled from the circuit. Thus, the auxiliary floating source can be used to implement an adjustable capacitor (e.g., in an impedance matching circuit) by selectively closing or opening $S_1$ to switch $C_2$ in or out of the total capacitance.

As mentioned above, auxiliary floating power sources are also well suited for communications-related applications. Such applications can include communications between components internal to the wireless power source, and communications between the wireless power source and the wireless power receiver that receives wirelessly transmitted power. A variety of different types of communications systems can be implemented. In some embodiments, for example, an auxiliary floating power source can be used to drive a transmitter located in a wireless power source to generate a communications signal that is received by the receiver connected to the receiving resonator.

Figure 10:
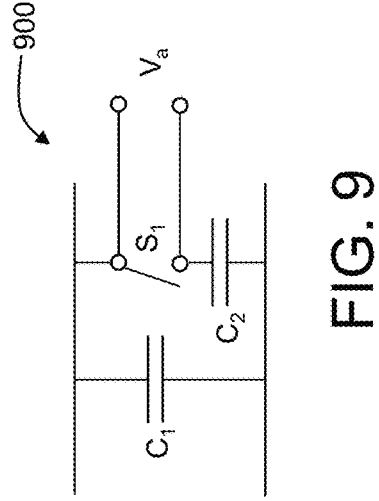
FIG. 10 is a schematic diagram of a portion of a wireless power transfer system that uses an auxiliary coil for wireless communication.

FIG. 10 is a schematic diagram showing a portion of a wireless power transfer system 1000, including a controller 1022 connected to a transceiver 1030 in a wireless power source, and a transceiver 1040 connected to a load 1020 that receives power from the wireless power source. A voltage $V_a$ is applied to transceiver 1030, which also receives an information signal from controller 1022. Transceiver 1030, energized by voltage $V_a$, generates a communications signal 1035 that carries the information from controller 1022. The communications signal is received by transceiver 1040 and delivered to device 1020, and the information encoded in the signal is extracted. Communications signals that correspond to a wide variety of different protocols and implementations can be transmitted in the foregoing manner, including Bluetooth® signals, wireless 802.11a/b/g/n signals, IrDA signals, and signals corresponding to other open and/or proprietary specifications.

In the above discussion, wireless power transfer system 1000 includes transceivers 1030 and 1040. In general, transceivers are devices that both transmit and receive communication signals. However, the system shown in FIG. 10, as well as the other systems disclosed herein, are not limited to the use of transceivers and/or two-way communication. It should be understood that any of the transceivers disclosed in connection with embodiments herein can be replaced with a transmitter or a receiver alone, or separate transmitters and receivers, for purposes of one-way communication. Thus, the term "transceiver" should be understood to include functional devices that can transmit only, receive only, or both transmit and receive communication signals.

Figure 11:
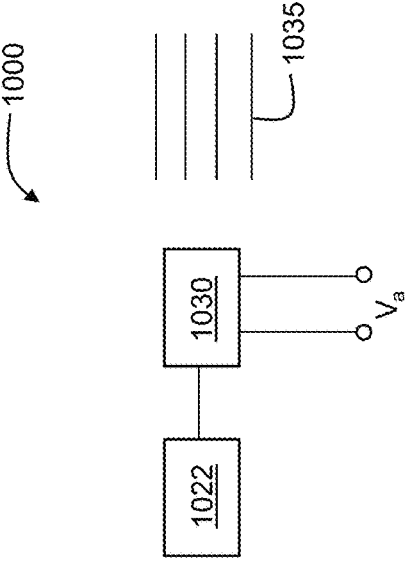
FIG. 11 is a schematic diagram of a portion of a wireless power transfer system that uses an auxiliary coil to modulate an analog communication signal.

In some embodiments, floating auxiliary voltage sources can be used to drive magnetic resonators that generate communications signals. FIG. 11 is a schematic diagram showing a portion of a wireless power transfer system 1100 that includes a source resonator coil 1102 in a wireless power source and a receiving resonator coil 1104 connected to a load 1120 that receives power wirelessly from the wireless power source. To generate a communications signal, voltage $V_a$ generated by a floating auxiliary source is applied to a modulator 1106. Voltage $V_a$ typically corresponds to an oscillating AC voltage signal at a frequency corresponding approximately to the frequency of the voltage applied to the source resonator coil in the wireless power source to generate the power transmitting magnetic field.

Modulator 1106 modulates voltage signal $V_a$ to encode information into the voltage signal. In some embodiments, for example, modulator 1106 generates an amplitude modulated voltage signal, where the information is encoded as variations in an amplitude envelope function that modulates the underlying sinusoidal AC voltage signal $V_a$. In certain embodiments, modulator 1106 generates a frequency modulated voltage signal, where the information is encoded as variations in the nominal frequency of the oscillating AC voltage signal $V_a$. Modulator 1106 can also implement other modulation or encoding schemes as well.

The modulated voltage signal is then delivered to source resonator coil 1102, where it generates a magnetic field that is modulated in a manner that corresponds to the modulation of the voltage signal. The modulated magnetic field is captured by receiving resonator coil 1104, and induces a voltage signal across the receiving resonator coil that is modulated in the same manner as $V_a$. Load 1120 (or circuits connected to load 1120) demodulates the induced voltage signal to extract the information encoded in it.

Figure 12:
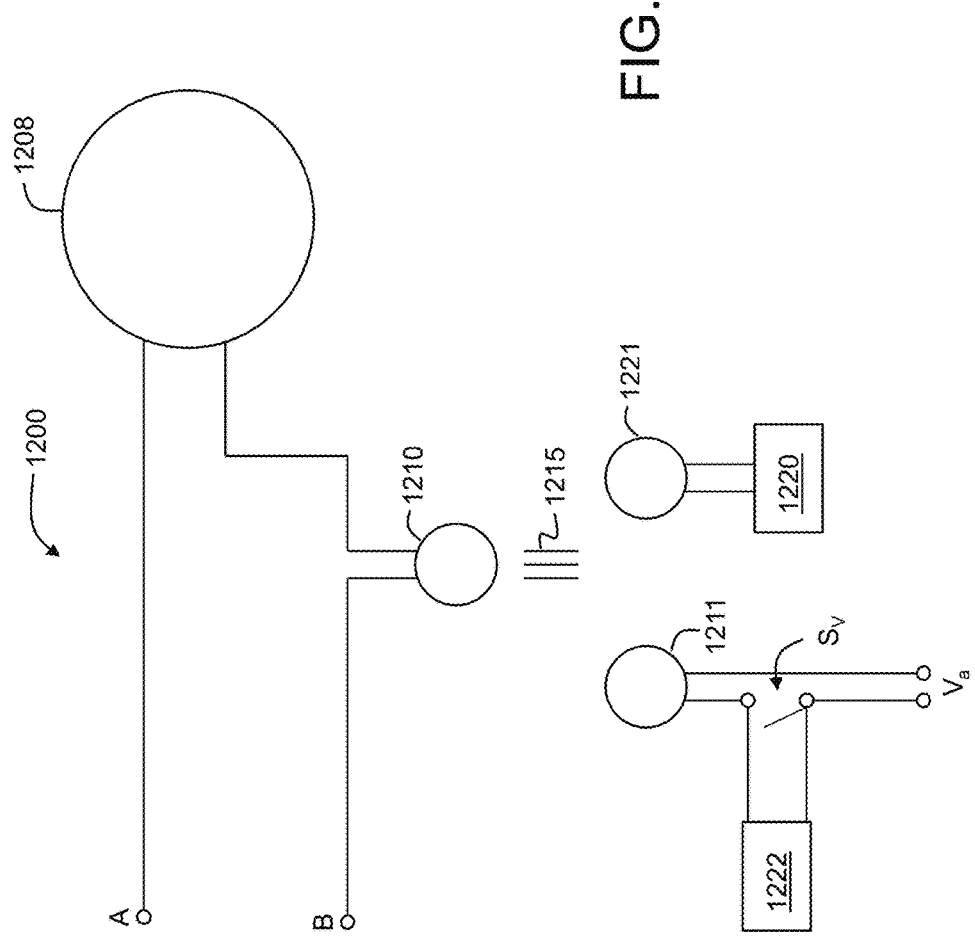
FIG. 12 is a schematic diagram of a portion of a wireless power transfer system that uses an auxiliary coil to generate a digital signal.

Amplitude and frequency modulation of a sinusoidal or other oscillating/periodic carrier wave signal are methods for implementing analog communication between a wireless power source and receiver. However, floating auxiliary voltage sources can also be used to implement digital communication between a source and receiver. FIG. 12 is a schematic diagram showing a portion of a wireless power transfer system 1200. In system 1200, a source resonator coil 1208 and an auxiliary coil 1210 are connected in series. When a driving voltage is applied across terminal points A and B, source resonator coil 1208 generates a magnetic field that transfers power to a receiver resonator (not shown in FIG. 12), and auxiliary coil 1210 generates an auxiliary magnetic field 1215.

System 1200 includes two additional auxiliary coils 1211 and 1221. Auxiliary coil 1211 is a component of the wireless power source, and auxiliary coil 1221 is connected to a device 1220 that receives power from the wireless power source. Auxiliary coil 1211 is connected in series with a switch $S_v$, which is controlled by controller 1222. Auxiliary coils 1211 and 1221 are positioned so that each coil captures a portion of magnetic field 1215. Accordingly, voltages are induced across each of coils 1211 and 1221 when coil 1210 generates field 1215.

Because both auxiliary coils 1211 and 1221 couple to coil 1210 through the same magnetic field 1215, a change in the coupling between coils 1211 and 1210 changes the coupling between coils 1221 and 1210, and vice versa. Put another way, the coupling between auxiliary coils 1210 and 1221—and therefore the voltage induced across auxiliary coil 1221—can be changed by adjusting the coupling between coils 1210 and 1211. System 1200 exploits this property by using switch $S_v$ to adjust the coupling between coils 1210 and 1211. When controller 1222 closes switch $S_v$, coil 1211 is connected or shorted within the wireless power source. Power is transferred from coil 1210 to coil 1211, and power transfer between coils 1210 and 1221 is therefore reduced or otherwise modulated. Conversely, when controller 1222 opens switch $S_v$ thereby decoupling or open-circuiting coil 1211 within the wireless power source, power transfer between coils 1210 and 1211 is reduced, and power transfer between coils 1210 and 1221 is increased or otherwise modulated.

Device 1220 connected to auxiliary coil 1221 senses the changes in induced voltage across coil 1221 as switch $S_v$ is opened and closed. As a result, controller 1222 can implement a digital (or bitwise) communication protocol that transmits information to device 1220 by opening and closing switch $S_v$ to alternately switch coil 1221 between high and low voltage states. In this method, controller 1222 does not directly generate a communication signal that is broadcast. Instead, controller 1222—through auxiliary coil 1211—effectively functions as a digital modulator that perturbs power transfer between two different coils (i.e., coils 1210 and 1221).

This method for generating an "on/off" signal can also be used to switch devices such as power supplies on and off. Using a method similar to the one described above, signals corresponding to high and low voltage states can be used to activate and de-activate, respectively, device 1220. Device 1220 can correspond to a power supply or to any one or more of various switchable electronic devices.

FIG. 12 shows communication of information from a wireless power source to a receiving device by modulating power transfer between an auxiliary coil connected in series with a source resonator coil and an auxiliary coil connected to the receiving device. Similar methods can be used to generate a digital communication signal that is received by auxiliary coil 1211 and controller 1222, i.e., coil 1221 can be alternately connected and disconnected by closing and opening a switch connected in series with coil 1221 by device 1220, thereby modulating coupling and the induced voltage across coil 1211 between high and low voltage states.

Two-way communication between the wireless power source and device 1220 can be implemented in various ways. In some embodiments, for example, coils 1211 and 1221 can be used both to effectively "transmit" and "receive" signals by interleaving these functions in time. For example, for a first period of time, coil 1211 can be alternately coupled and decoupled by controller 1222 to induce voltage changes across coil 1221, thereby communicating information to device 1220. Then, for a second period of time, coil 1221 can be alternately coupled and decoupled by device 1220 to induce voltage changes across coil 1211, thereby communicating information to the wireless power source. The alternating of functionalities defines a duty cycle for coils 1211 and 1221 that enables two-way communication.

In certain embodiments, system 1200 includes additional auxiliary coils to enable simultaneous two-way communication. For example, system 1200 can include a second auxiliary coil connected in series with source coil 1208 that generates a second auxiliary magnetic field, analogous to field 1215. Two additional auxiliary coils, one implemented as part of the wireless power source and the other connected to device 1220, are positioned so that each captures a portion of the second auxiliary magnetic field, analogous to auxiliary coils 1211 and 1221.

The generation of two magnetic fields by two different auxiliary coils connected in series with source resonator coil 1208 allows the wireless power source to transmit information to, and receive information from, device 1220 at the same time. In particular, one of the auxiliary magnetic fields can be used to induce an information-carrying voltage signal that is received by device 1220, while the other auxiliary magnetic field can be used to induce an information-carrying voltage signal that is received by the wireless power source, as disclosed above. In this manner, digitally encoded information can be transmitted bi-directionally between the wireless power source and device 1220.

Other applications can also take advantage of the auxiliary coils disclosed herein. For example, auxiliary coils can be used to isolate sensitive analog circuitry from noisy power ground connections, thereby ensuring that such circuitry operates at high sensitivity. Auxiliary coils can also be used to implement feedback systems in which power from one or more auxiliary coils is used to adjust coupling to provide a regulated source (i.e., perform auxiliary coil-mediated voltage regulation).

Other Embodiments

A number of embodiments have been described. Nevertheless, it will be understood that various modifications may be made without departing from the spirit and scope of the disclosure. Accordingly, other embodiments are within the scope of the following claims.

What is claimed is:

1. A wireless power transmitter, comprising:
a power source;
a first coil connected to the power source;
a second coil connected in series to the first coil; and
a third coil positioned in proximity to the second coil, wherein during operation of the wireless power transmitter:
  the power source applies a driving voltage to the first and second coils;
  the first coil generates a first magnetic field that transfers power to a receiver resonator;
  the second coil generates a second magnetic field that induces a voltage across the third coil; and
  the induced voltage across the third coil is applied to a component of the wireless power transmitter.

2. The transmitter of claim 1, wherein each one of the first, second, and third coils comprises one or more loops of conductive material.

3. The transmitter of claim 1, wherein the component comprises at least one of a resistive element, a capacitive element, an inductive element, and a switch of the wireless power transmitter.

4. The transmitter of claim 1, wherein the component comprises a component of an impedance matching network of the wireless power transmitter.

5. The transmitter of claim 1, wherein the component comprises a transceiver configured to generate an information carrying signal.

6. The transmitter of claim 1, wherein the component comprises a fourth coil configured to generate an information carrying magnetic field that, during operation, is received by a fifth coil connected to the receiver resonator, the transmitter further comprising a modulator configured to modulate the induced voltage to generate the information carrying magnetic field, wherein the induced voltage corresponds to an oscillating voltage signal, and wherein the modulator is configured to modulate at least one of an amplitude and a frequency of the oscillating voltage signal to generate the information carrying magnetic field.

7. The transmitter of claim 1, wherein a magnitude of the induced voltage is 1% or less of a magnitude of a voltage induced in the receiver resonator.

8. The transmitter of claim 1, wherein the induced voltage is not referenced to a ground voltage of the wireless power transmitter.

9. A method, comprising:
applying a driving voltage across first and second coils connected in series in a wireless power transmitter to generate a first magnetic field and a second magnetic field, wherein the first magnetic field transfers power wirelessly to a receiver resonator, and wherein the second magnetic field induces a voltage across a third coil positioned in proximity to the second coil in the wireless power transmitter; and
applying the induced voltage to a component of the wireless power transmitter.

* * * * *